(12) United States Patent
Ayukawa et al.

(10) Patent No.: US 7,588,507 B2
(45) Date of Patent: Sep. 15, 2009

(54) THIN AUTOTENSIONER

(75) Inventors: Kazumasa Ayukawa, Nara (JP); Hiromi Matsuura, Nara (JP)

(73) Assignee: Unitta Company, Osaka (JP)

( * ) Notice: Subject to any disclaimer, the term of this patent is extended or adjusted under 35 U.S.C. 154(b) by 1606 days.

(21) Appl. No.: 09/961,365

(22) Filed: Sep. 25, 2001

(65) Prior Publication Data

US 2002/0177499 A1 Nov. 28, 2002

(30) Foreign Application Priority Data

| Apr. 13, 2001 | (JP) | ............... P2001-114769 |
| Apr. 13, 2001 | (JP) | ............... P2001-115003 |
| Apr. 26, 2001 | (JP) | ............... P2001-129141 |

(51) Int. Cl.
*F16H 7/08* (2006.01)
*F16H 55/32* (2006.01)

(52) U.S. Cl. ............... 474/135; 474/94; 474/112; 474/133

(58) Field of Classification Search ............... 474/135, 474/133, 109, 136, 138, 101, 114–117, 137, 474/94, 112

See application file for complete search history.

(56) References Cited

U.S. PATENT DOCUMENTS

| 4,723,934 A | | 2/1988 | Thomey |
| 4,813,915 A | * | 3/1989 | Kotzab ............... 474/133 |
| 5,334,109 A | * | 8/1994 | Izutsu et al. ............... 474/135 |
| 5,599,245 A | | 2/1997 | Giese |
| 5,632,697 A | * | 5/1997 | Serkh ............... 474/109 |
| 5,702,314 A | | 12/1997 | Schmid |
| 5,967,919 A | * | 10/1999 | Bakker ............... 474/135 |
| 6,102,820 A | * | 8/2000 | Imaharu et al. ............... 474/135 |
| 6,497,632 B2 | * | 12/2002 | Ayukawa et al. ............... 474/135 |

FOREIGN PATENT DOCUMENTS

| CA | 2243360 | 4/1999 |
| DE | 3637103 | 5/1988 |
| DE | 3728158 A1 * | 3/1989 |
| DE | 4431801 | 3/1996 |
| EP | 351630 | 1/1990 |

(Continued)

OTHER PUBLICATIONS

English Language Abstract for DE Appl. No. 44 31 801, Mar. 14, 1996.

(Continued)

*Primary Examiner*—Marcus Charles
(74) *Attorney, Agent, or Firm*—Greenblum & Bernstein P.L.C.

(57) ABSTRACT

An autotensioner comprises a torsion coil spring interposed between a base and a rocking arm, and a tubular bushing provided between an inside surface of the base and an outside surface of the rocking arm. The torsion coil spring pushes and biases the rocking arm toward the bushing, and brings the pushing direction substantially in coincidence with the axial load direction of the force, acting on a stepped bolt supporting the rocking arm, from a belt. When the belt tension becomes high, the arm axial center displaces slightly from the base axial center, an extremely large first damping force acts on the rocking arm. When the belt tension becomes low, the smaller second damping force acts on the rocking arm.

5 Claims, 17 Drawing Sheets

FOREIGN PATENT DOCUMENTS

| | | |
|---|---|---|
| EP | 0509313 | 10/1992 |
| EP | 0907040 | 4/1999 |
| EP | 967412 | 12/1999 |
| GB | 2102097 | 1/1983 |
| GB | 2377981 | 1/2003 |
| JP | 02-102956 | 4/1990 |
| JP | 4347042 | 12/1992 |
| JP | 583516 | 11/1993 |
| JP | 74481 | 1/1995 |
| JP | 791509 | 4/1995 |
| JP | 7113448 | 5/1995 |
| JP | 08-21498 A * | 1/1996 |
| JP | 2000320629 | 11/2000 |
| WO | 95/29347 | 11/1995 |

OTHER PUBLICATIONS

English Language Abstract for DE Appl. No. 36 37 103, May 24, 1988.
English Language Abstract for JP Appl. No. 4-347042, Dec. 2, 1992.
English Language Translation of JP Appln. No. 5-83516, Nov. 12, 1993.
English Language Translation of JP Appln. No. 7-4481, Jan. 10, 1995.
English Language Translation of JP Appln. No. 7-91509, Apr. 4, 1995.
English Language Translation of JP Appln. No. 7-113448, May 2, 1995.
English Language Translation of JP Appln. No. 2000-320629, Nov. 14, 2000.
English Language abstract of JP 02-102956, Apr. 16, 1990.

* cited by examiner

TORSION COIL SPRING ALONE

TORSION COIL SPRING + BUSHING

THIN AUTOTENSIONER

BACKGROUND OF THE INVENTION

1. Field of the Invention

The present invention relates to an autotensioner imparting a suitable tension to a timing belt of an automobile engine or a belt driving a plurality of auxiliary equipment.

2. Description of the Related Art

An autotensioner is employed in a belt drive mechanism for transmitting drive power of an engine to a plurality of equipment by a single endless belt. It imparts a suitable tension to the belt and causes the vibration of the belt caused by the fluctuation of the rotational speed and load of the engine to attenuate. Due to this, the drive force of the engine is reliably transmitted to the equipment.

In general, an autotensioner is provided with a cup-shaped base fixed to an engine block etc., a rocking arm rotatably axially supported at the base, and a pulley attached to the front end of the rocking arm and abutting against the belt. The rocking arm is rotationally biased in a direction tensing the belt by a torsion coil spring, which is housed in the base and is provided substantially concentrically with the center of rotation. Due to this, suitable tension is imparted to the belt. Further, a bushing or friction member is provided between the rocking arm and the base for frictionally sliding with at least one of the same. Due to the bushing, a frictional force forming a rotational resistance occurs when the rocking arm rotates relative with respect to the base, the rotation of the rocking arm is damped, and vibration of the belt is attenuated.

In recent years, along with the improved performance of engines, the fluctuation in the rotational speed of the engine and the load applied to the belt has increased. The fluctuation of tension of the belt has also become larger. Therefore, when the damping force is small, the fluctuation in tension of the belt cannot be fully suppressed, and this results in vibration together with vibration of the belt. Therefore, to improve the damping performance of the autotensioner, a higher damping force is required. In particular, it is preferable to make the damping force acting on the rocking arm when the belt is tense (first damping force) larger than the damping force acting on the rocking arm when the belt is slack (second damping force).

To answer this demand, some damping mechanisms provided with the friction member have been proposed. However, in the conventional damping mechanisms, it is difficult to make the first damping force much different from the second damping force, and if the twisting torque of the torsion coil spring is raised to increase the damping force, not only the first damping force, but also the second damping force increases and the timing of tensing of the belt becomes slower, that is, the problem arises of a fall in the ability to follow the belt.

Thus, in the conventional damping mechanisms, it was not possible to simultaneously satisfy both the demands of improving the damping performance of the autotensioner and maintaining the ability to follow the belt well.

On the other hand, in recent years, along with the increasingly smaller size of engines, autotensioners have been required to be made smaller in size as well. If for example the base is made smaller in size, the space where the torsion coil spring is housed becomes smaller, so the torsion coil spring which can be housed is also limited to a smaller one. On the other hand, along with the increasingly sophisticated performance of engines in recent years, autotensioners have been required to have a considerable biasing force. For an autotensioner having a considerable biasing force, a torsion coil spring having a considerable spring constant and a considerable spring biasing force is required. The spring constant and spring biasing force are determined by the coil length, wire diameter, etc. Therefore, for an autotensioner to have the necessary biasing force, a space able to house a considerable spring is required. In an autotensioner, in which the size of the base is reduced, it is not possible to house a torsion coil spring having a sufficient torque, and the biasing force to the belt may become insufficient.

Further, the friction member is required to be water resistant and to remain unchanged in frictional force even when sprayed with water, in addition to being superior in heat resistance, abrasion resistance, strength, and dimensional stability. In the past, a synthetic resin superior in heat resistance, for example, a nylon resin, has been used for friction members. A friction member made of a nylon resin, however, increases in frictional force with the rocking arm when exposed to water or salt water, so there was the problem that smooth rotation of the rocking arm was obstructed and abnormal noise occurred from the autotensioner or belt.

SUMMARY OF THE INVENTION

Therefore, a first object of the present invention is to improve the damping performance without reducing the following ability of the autotensioner.

According to the present invention, there is provided an autotensioner comprising a base, a rocking arm, a pulley, and a torsion coil spring. The base has a bottomed tubular shape. The rocking arm has a tubular part rotatably supported at the inside of the base. The pulley is attached to one end of the rocking arm, and abuts against a belt. The torsion coil spring is housed in the base, and biases rotation of the rocking arm in a direction tensing the belt with respect to the base. The torsion coil spring is attached eccentrically to the axial center of the base, and the rocking arm is supported so as to be able to be displaced relative to the base, whereby the first damping force acting on the rocking arm when the belt is tensed becomes relatively larger than the second damping force acting on the rocking arm when the belt is slack.

Preferably, the rocking arm is attached movably in the radial direction to the base.

The autotensioner may be further provided with a friction member interposed between the outer circumferential surface of the tubular part of the rocking arm and the inner circumferential surface of the base, and provided across a range of at least 180 degrees around the axial center of the base, and part of the tubular part may be biased to be pushed against the friction member by the torsion coil spring. Due to this, it is possible to generate a large frictional force.

The friction member may also be provided with a plurality of projections for dispersing the load acting in a direction in which the torsion coil spring pushes and biases the arm tubular part. Due to this, it is possible to prevent local abrasion and damage of the friction member.

The autotensioner may be further provided with a damping member separate from the friction member. Specifically, the damping member may engage with the rocking arm movably in the radial direction and frictionally slide with the base, so that a large damping force can be set.

The magnitude of the first damping force is preferably 1.5 to 3.5 times the magnitude of the second damping force.

A second object of the present invention is to obtain an autotensioner in which the thickness and size of a base is reduced while a sufficient biasing force to the drive belt can be obtained.

According to the present invention, there is provided a thin autotensioner comprising a base, a rocking arm, and a torsion coil spring. The base has a cup having an inside diameter. The rocking arm is rotatably supported by the base. The torsion coil spring biases the arm in a predetermined direction. The torsion coil spring has an outside diameter larger than the inside diameter, and is twisted in a direction in which the outside diameter is compressed so as to be housed inside the cup.

Preferably, the torsion coil spring is engaged at one end with a first engagement part provided inside the base, and is engaged at the other end with a second engagement part provided inside the arm. The engagement part differs when the torsion coil spring engages with the first engagement part and the second engagement part and when the rocking arm is attached to the base.

For example, an axial length of the torsion coil spring is shorter than the outside diameter.

The autotensioner may further be provided with at least one friction member interposed between the cup and the rocking arm and giving a frictional resistance to the rocking of the rocking arm. The friction member may be composed of a tubular part, and a flange projecting from a bottom of the tubular part to an inside direction of the cup and rocking arm, and exhibits an L-shape in cross-section.

Further, according to the present invention, there is provided a method of assembly of a thin tensioner comprising a first step of twisting a torsion spring coil having an outside diameter larger than an inside diameter of a cup to make the outside diameter smaller than the inside diameter, and a second step of interposing the twisted torsion coil spring between the cup and rocking arm.

Furthermore, according to the present invention, there is provided a method of assembly of a thin tensioner comprising a first step of engaging one end of a torsion coil spring having an outside diameter larger than an inside diameter of a cup with the cup, a second step of engaging another end of the torsion coil spring with a rocking arm, a third step of rotating the rocking arm to twist the torsion coil spring and make the outside diameter smaller than the inside diameter, a fourth step of bringing the rocking arm into proximity with the cup to compress the torsion coil spring and house it in the cup, and a fifth step of rotatably fastening the rocking arm to the cup.

A third object of the present invention is to improve the friction member of an autotensioner and prevent the occurrence of abnormal noise.

According to the present invention, there is provided an autotensioner comprising a base, a rocking arm, and a friction member. The base has a first tubular part having a bottomed tubular shape. The rocking arm has a second tubular part, which is attached rotatably to an open side of the base and is separated by a certain distance from the first tubular part in the radial direction. The friction member is provided between the first tubular part and the second tubular part, and brakes the rocking arm. The friction member is partially exposed, and is formed from a material mainly comprised of a polyphenylene sulfide resin.

A torsion coil spring may be provided at an inside of the second tubular part of the rocking arm, to bias the rocking arm in a certain rotational direction and push the second tubular part and the friction member toward the first tubular part. Due to this, it is possible to obtain a frictional force changing in accordance with the tension of the belt by a simple configuration.

The autotensioner is preferably provided with a rocking shaft member that supports the rocking arm rotatably with respect to the base, and passes through the bottom part of the base while forming a clearance with respect to the base. Due to this, even if the friction member is abraded, it is possible to keep the rocking arm sliding with the friction member at all times and a stable frictional force is obtained.

The friction member may be a tubular member partially cut away in the circumferential direction, and can be manufactured relatively easily. Further, the friction member may have a plurality of grooves on its surface and the surface frictionally slides with the rocking arm, the grooves extending across the entire axis of the friction member. By allowing abraded dust to escape through the grooves, damage to the frictional sliding surface by the abraded dust is prevented.

The axial length of the first tubular part and the axial length of the second tubular part may be substantially equal, and the friction member may be in close contact with the first tubular part and the second tubular part across the entire axis of the friction member. Due to this, it is possible to increase the area of the receiving surface and receive a larger load.

Further, according to the present invention, there is a friction member provided in an autotensioner rotatably attaching a rocking arm to a base, characterized by being provided between the rocking arm and the base, and being formed by a material mainly comprised of a polyphenylene sulfide resin. To set the material of the bushing to a frictional coefficient in accordance with the load to be applied, a polytetrafluoroethylene resin etc. is blended in the polyphenylene sulfide resin.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
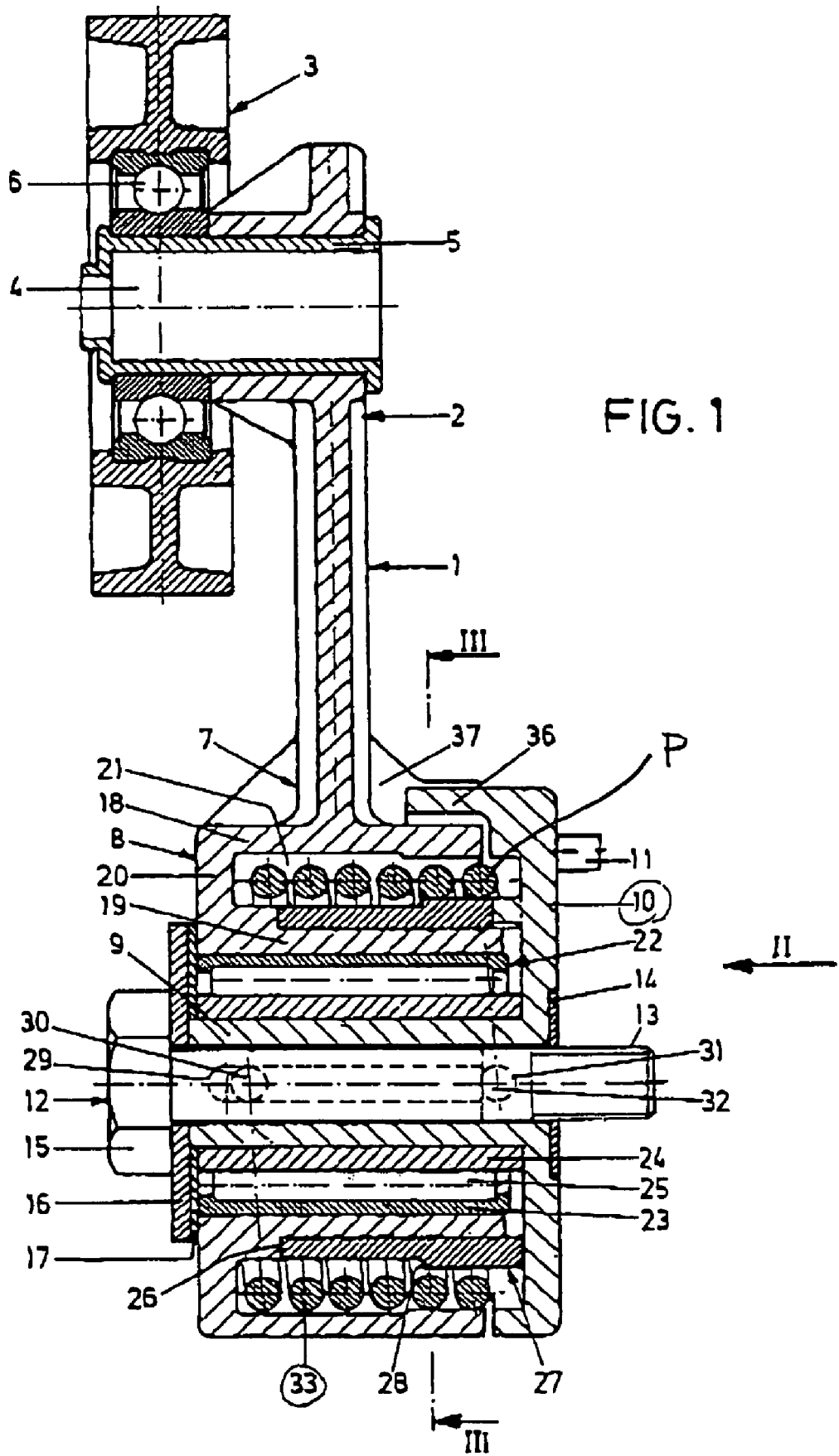
FIG. 1 is a view of a belt drive mechanism employing an autotensioner of the present invention.

The present invention will be described below with reference to the embodiments shown in the drawings.

FIG. 1 is a view of a belt drive mechanism employing an autotensioner according to a first embodiment of the present invention. The belt drive mechanism has a single endless belt 10. This belt 10 is wrapped around a drive pulley 12 attached to an output shaft of an engine (not shown), and driven pulleys attached to a plurality of apparatuses, for example, an air-conditioner pulley 14, a power steering system pulley 16, and an alternator pulley 18. When the drive pulley 12 rotates, the belt 10 rotates in the clockwise direction of the drawing and the rotational drive force is transmitted to the pulleys 14, 16, and 18 of the equipment.

The autotensioner 20 is arranged in proximity to the drive pulley 12, more particularly in the belt rotational direction after the drive pulley 12 where the belt 10 most easily becomes slack. The pulley 22 of the autotensioner 20 abuts against the back surface of the belt 10. Namely, the pulley 22 contacts the outer circumference side of the belt, while the pulley 22 rotates about the rotational axis thereof. The rocking arm 24 biases the pulley 22 to rotate in the arrow B direction in which the belt 10 is tensed, so that a suitable tension is applied to the belt 10 at all times.

When the belt 10 vibrates due to fluctuation of the engine rotational speed or load, the vibration is transmitted to the rocking arm 24 through the pulley 22, the rocking arm 24 rocks about the axial center L4 of rocking, and the pulley 22 is moved relatively between the first position shown by the solid line and the second position shown by the broken line. When the rocking arm 24 is rocking, the rocking arm 24 and the bushing (or friction member) 26 frictionally slide and the frictional force generated acts as a damping force braking the rocking arm 24. Thus, the relative movement of the pulley 22 is suppressed, and the vibration of the belt 10 is attenuated.

If the tension of the belt 10 rapidly increases and the pulley 22 is pushed toward the second position, the rocking arm 24 rotates relatively in the clockwise direction (arrow A direction). At this time, a relatively large first damping force acts on the rocking arm 24, so that the pulley 22 moves slowly, and effectively suppresses the vibration of the belt 10. Conversely, if the belt 10 becomes slack and the pulley 22 moves toward the first position following the belt 10, the rocking arm 24 rotates relatively in the counterclockwise direction (arrow B direction) about the axial center L4 of rocking. At this time, a relatively small second damping force acts on the rocking arm 24, so that the pulley 22 moves quickly toward the belt 10 to tense the belt 10.

Figure 2:
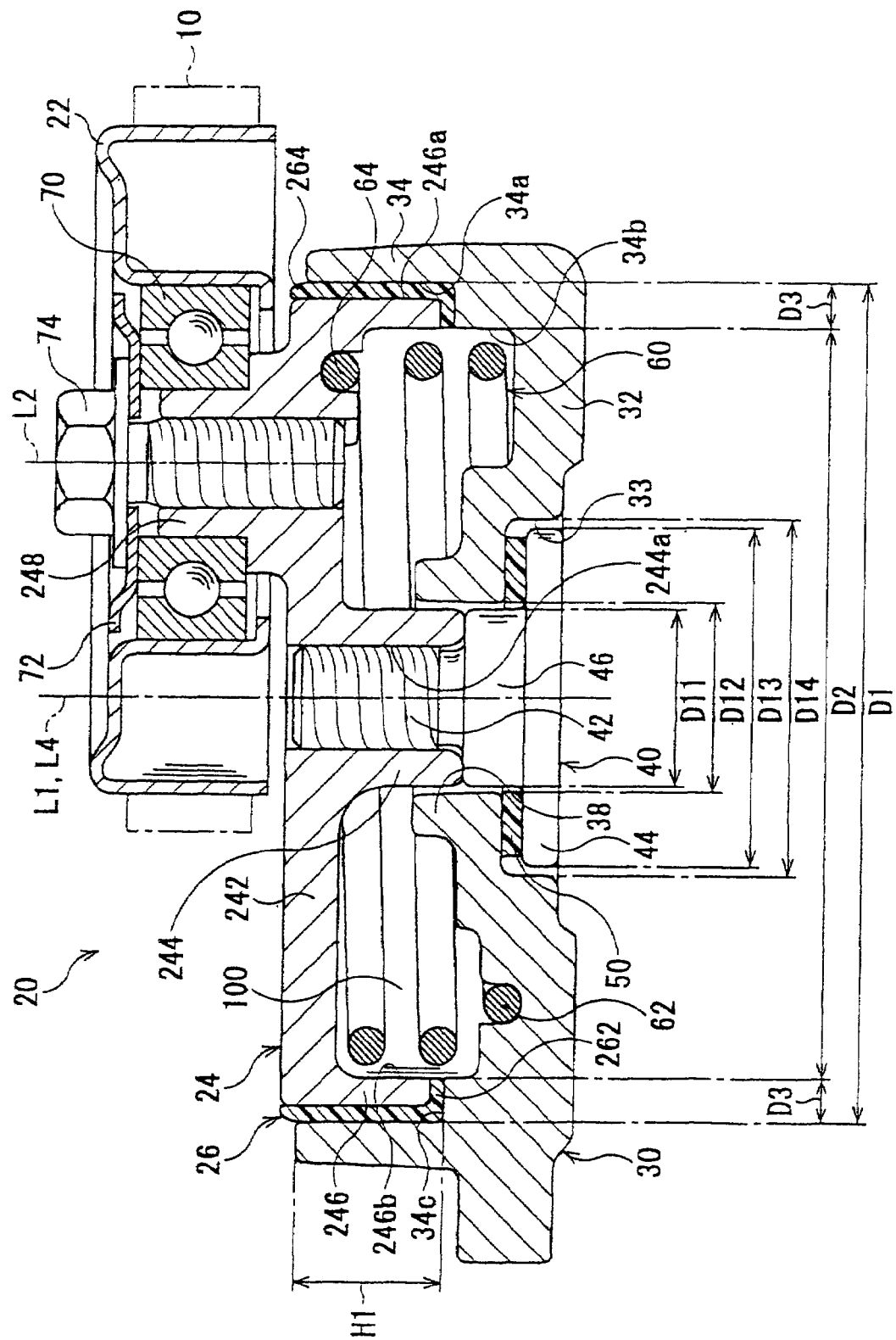
FIG. 2 is a sectional view of a first embodiment of an autotensioner according to the present invention.
Figure 3:
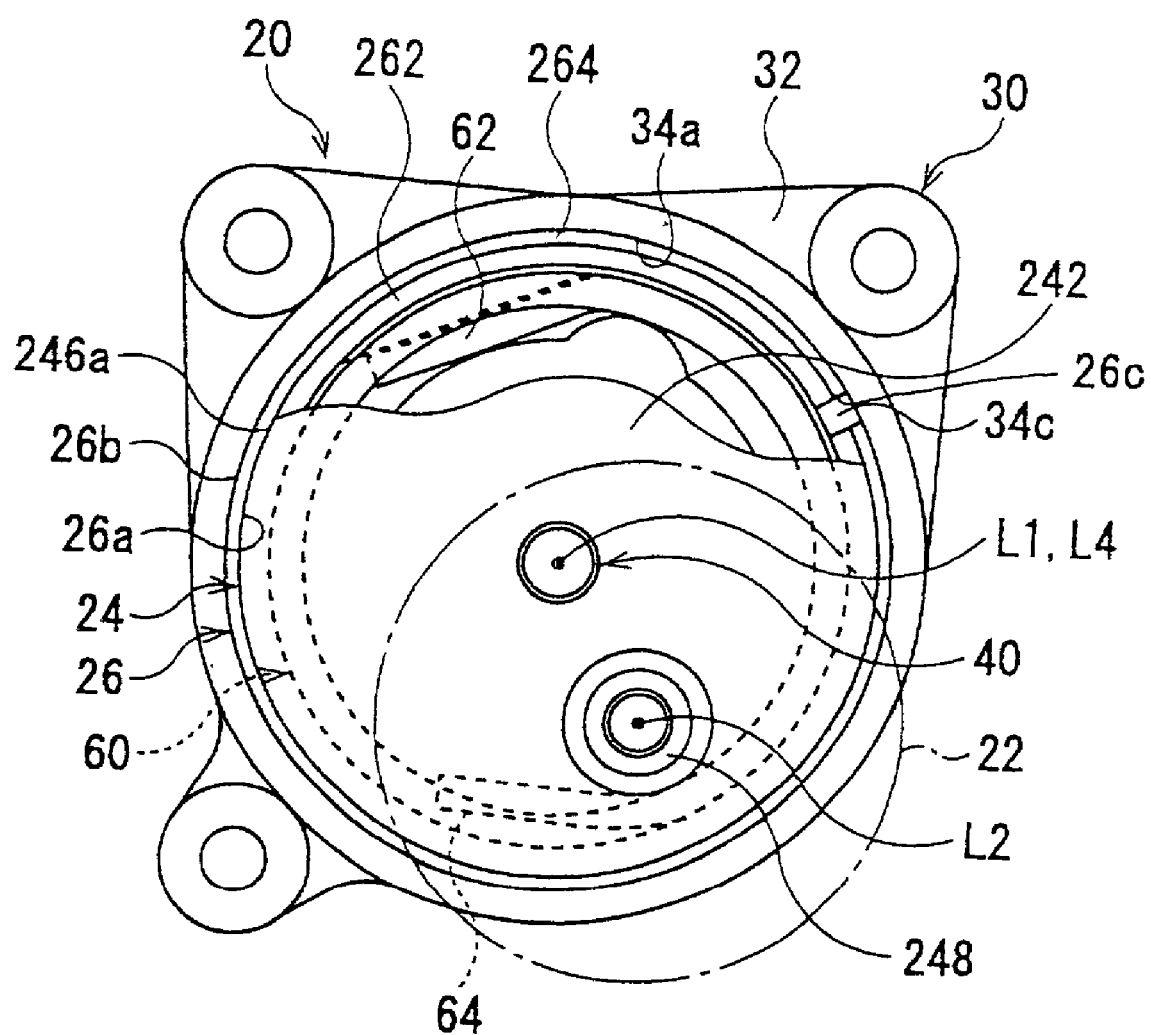
FIG. 3 is a plan view of the autotensioner shown in FIG. 2 seen from a pulley.

FIG. 2 is a sectional view of the autotensioner 20, while FIG. 3 is a plan view of the autotensioner 20 seen from the pulley 22 side. In FIG. 3, part of the rocking arm 24 is shown cut away, while the pulley 22 is shown by a one-dot chain line.

The autotensioner 20 is provided with a base 30 formed from an aluminum alloy or other metal material integrally in a bottomed tubular shape. The base bottom 32 is fixed to the engine block (not shown). The base tubular part 34 extends perpendicularly from the outer circumferential edge of the base bottom 32. The inside is formed in a stepped shape. Namely, the inside is formed with two tubular surfaces based on the base axial center L1 and having different diameters, i.e., the open side inner circumferential surface 34a and the bottom side inner circumferential 34b, and the ring-shaped seat 34c linking these two inner circumferential surfaces 34a and 34b. The diameter Dl of the open side inner circumferential surface 34a is larger than the diameter D2 of the bottom side inner circumferential surface 34b, while the ring-shaped seat 34c is a plane having a certain width D3 and perpendicular to the base axial center L1.

A circular base shaft hole part 38 is formed at the center of the base bottom 32. A stepped bolt 40 is inserted from the bottom in FIG. 2 at the inside of the base shaft hole part 38. The rocking arm 24 is attached mockingly to the base 30 by the stepped bolt 40. In the state without the belt 10 wound around the pulley, the axial center of the stepped bolt 40 and the axial center L4 of rocking of the rocking arm 24 substantially coincide with the base axial center L1.

The rocking arm 24 is formed integrally from an aluminum alloy or other metal material, and exhibits a bottomed tubular shape open toward the base bottom 32. The arm bottom 242 is arranged at the inside of the opening of the base 30. A tubular rocking shaft 244 extending toward the base bottom 32 is arranged at the center. The rocking shaft 244 is opened at the two ends, and a female thread 244a is formed at the inner circumferential surface thereof. By the screwing of the female thread 244a with the male thread 42 formed at the front end of the stepped bolt 40, the stepped bolt 40 and the rocking arm 24 are integrally fastened.

The front end of the rocking shaft 244 enters the base shaft hole part 38, and abuts against the cylindrical part 46 of the stepped bolt 40. Part of the cylindrical part 46 is arranged at the inside of the base shaft hole part 38, and has the same outside diameter as the rocking shaft 244. A clearance is provided between the rocking shaft 244 and cylindrical part 46 and the base shaft hole part 38, so that the rocking arm 24 can rotate relatively without interference with the base 30.

The head 44 of the stepped bolt 40 is a disk having an outside diameter larger than the inside diameter of the base shaft hole part 38, and is engaged with the base bottom 32. Explaining this in more detail, a bolt receiving part 33 defined by a cylindrical hole larger than the head 44 is formed in the base bottom 32. The bolt receiving part 33 communicates with the base shaft hole part 38, and opens downward in FIG. 2. The head 44 is housed in the bolt receiving part 33 so as not to project out from the base bottom 32. The rocking arm 24 is biased in a direction (upward in FIG. 2), separating the arm 24 from the base 30, by the torsion coil spring 60 compressed in the base axial center L1 direction. By the engagement of the head 44 with the bolt receiving part 33 through a thrust bearing 50, relative movement of the rocking arm 24 along the base axial center L1 direction is limited.

The thrust bearing 50 is a ring-shaped member provided between the head 44 of the stepped bolt 40 and the bolt receiving part 33, and makes the head 44 and the bolt receiving part 33 rotate smoothly relative to each other. The thrust bearing 50 is formed from for example a synthetic resin material having a self-lubrication property.

The inside diameter D12 of the base shaft hole part 38 is formed to be slightly larger than the outside diameter D11 of the rocking shaft 244 and the bolt cylindrical part 46. Further, the inside diameter D14 of the bolt receiving part 33 is formed to be slightly larger than the outside diameter D13 of the bolt head 44. Due to this, the rocking arm 24 and the stepped bolt 40 can smoothly rotate relatively without interference with the base 30. Further, slight displacement of the axial center L4 of rocking with respect to the base axial center L1 is allowed.

The rocking arm 24 has a pulley bearing 248 projecting out to the opposite side of the base 30 from the arm bottom 242. The pulley 22 is rotatably attached to the outside of the radial direction of the pulley bearing 248 through a ball bearing 70. The axial center L2 of rotation of the pulley 22 is parallel to the axial center L4 of rocking. The ball bearing 70 is fastened to the pulley bearing 248 by the mounting bolt 74 screwed inside the pulley bearing 248 and the washer 72 interposed between the head of the mounting bolt 74 and the top end of the ball bearing 70.

An arm tubular part 246 extending toward the base bottom 32 is integrally provided at the outer circumferential edge of the arm bottom 242. The arm outer circumferential surface 246a is parallel to the open inner circumferential surface 34a inside the base tubular part 34, and faces it across a predetermined distance. A tubular bushing 26 in contact with the two surfaces is provided across the entire axis between the arm outer circumferential surface 246a and the open side inner circumferential surface 34a.

The arm inner circumferential surface 246b has a diameter equal to the diameter D2 of the base side inner circumferential surface 34b of the base 30, and is positioned on the same tubular surface as the bottom side inner circumferential surface 34b in the state with the rocking arm 24 attached to the base 30. A ring-shaped chamber 100 of an outside diameter D2 is formed by the base bottom 32, the arm bottom 242, the bottom side inner circumferential surface 34b of the base 30, the arm inner circumference 246b, the base shaft hole part 38, and the rocking shaft 244. The torsion coil spring 60 is housed in the ring-shaped chamber 100. An axial length of the torsion coil spring 60 is shorter than an outside diameter of the torsion coil spring 60.

The torsion coil spring 60 is a coil spring wound near the arm inner circumferential surface 246b. One end 62 of the torsion spring 60 is engaged with the base bottom 32, while the other end 64 is engaged with the arm bottom 242. The torsion coil spring 60 is interposed in the state twisted by a predetermined angle in the clockwise direction of FIG. 1 where the coil diameter is compressed, and compressed in the base axial center L1 direction. Due to the twisting torque of the torsion coil spring 60 for elastic return in a direction increasing the coil diameter, the rocking arm 24 is biased to the counterclockwise direction of FIG. 1 about the base axial center L1, so that a predetermined tension is imparted to the belt 10 wound around the pulley 22.

Since the torsion coil spring 60 is a coil spring, the reaction force of the twisting torque does not uniformly act about the base axial center L1, and a part of the arm tubular part 246 is biased and pushed toward a portion of the bushing 26 and the base tubular part 34 at the outside in the radial direction due to the torsion coil spring 60. In the state with the belt 10 wrapped around the pulley 22 (see FIG. 3), a frictional force is generated between the arm tubular part 246 and the bushing 26 by the combined force of the force of the belt 10 pushing the pulley 22 and the biasing force of the torsion coil spring 60.

For example, if the tension of the belt 10 falls, the force received from the belt 10 falls, so the frictional force becomes smaller, the ability of the pulley 22 to follow the belt 10 is raised, and a fall in tension of the belt 10 is prevented. Conversely, if the tension of the belt 10 increases, the force received from the belt 10 also increases, the frictional force becomes greater, and the rocking of the rocking arm 24 is attenuated. Thus, the magnitude of the frictional force changes relatively at the autotensioner 20.

Figure 4:
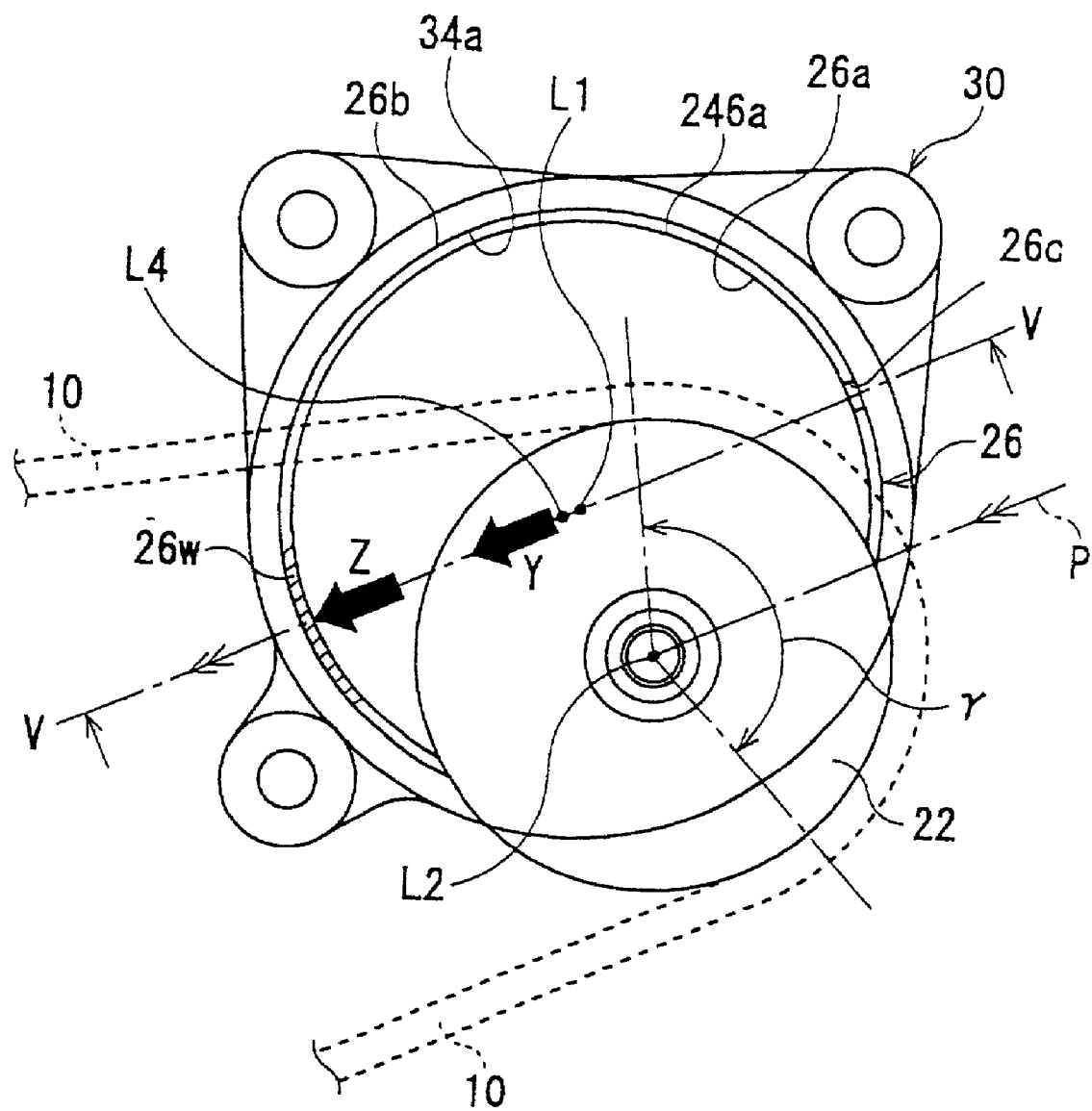
FIG. 4 is a plan view of the autotensioner with a stationary belt wrapped around it.
Figure 5:
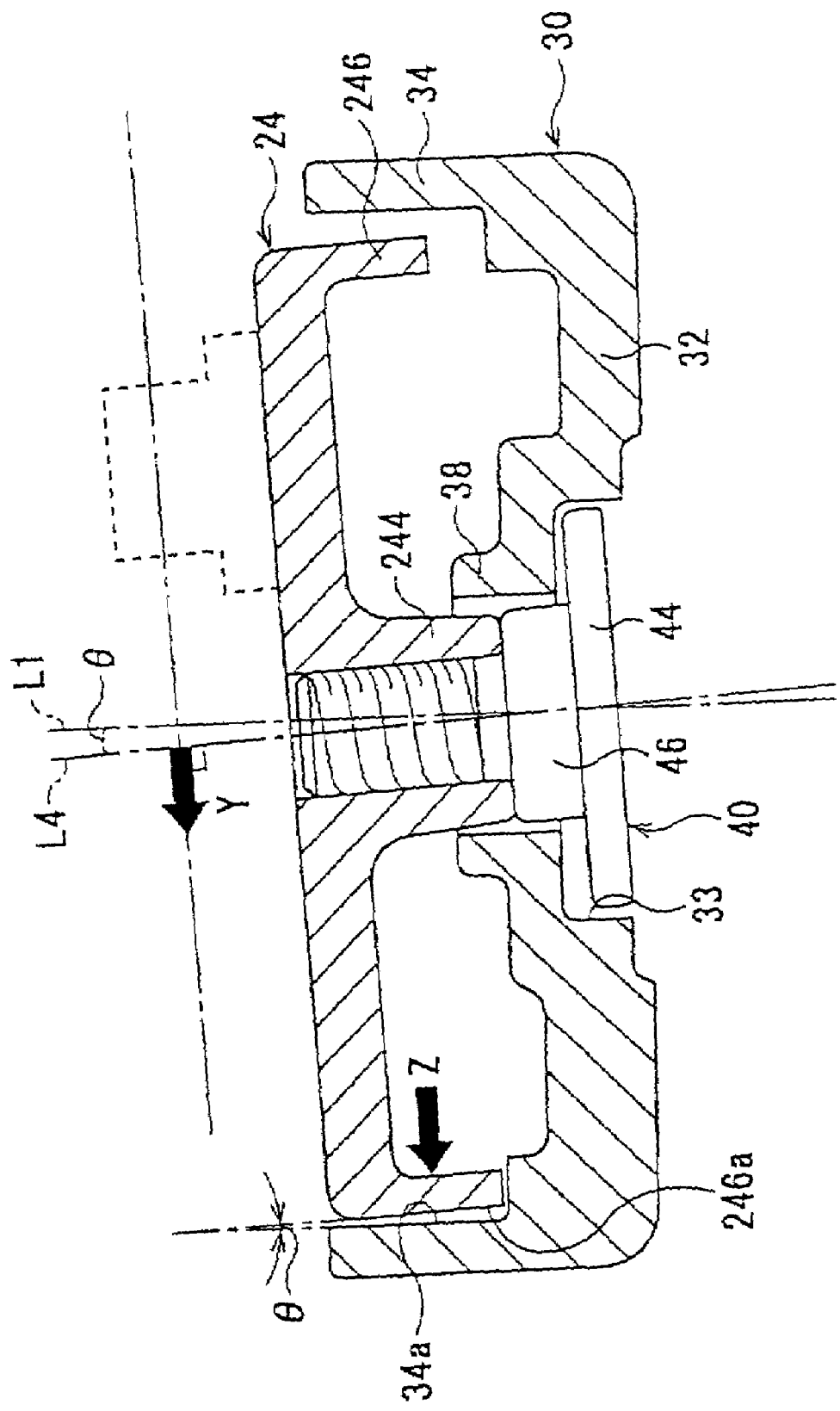
FIG. 5 is an end view of an autotensioner along the line V-V of FIG. 4 showing only a base, rocking arm, and stepped bolt.

With reference to FIG. 4 and FIG. 5, an operation of the autotensioner is described below. FIG. 4 is a plan view of an autotensioner 20 when a stationary belt 10 is wrapped around it, while FIG. 5 is an end view along the line V-V passing through the base axial center L1. Note that, in FIG. 5, to avoid complicating the drawing, only the rocking arm 24, base 30, and stepped bolt 40 are shown. The rest of the configuration is omitted.

When the belt 10 pushes the pulley 22, a load is applied to the stepped bolt 40 and the rocking arm 24 in an axial load direction Y parallel to the line P equally splitting in two the belt winding angle y. At this time, as shown in FIG. 5, a moment trying to tilt the axial center L4 of rocking from the base axial center L1 about the base bottom 32 side acts on the rocking arm 24. As explained above, a clearance is provided between the rocking shaft 244 and bolt cylindrical part 46 and the base shaft hole part 38 and between the bolt head 44 and the bolt receiving part 33. Therefore, due to the pushing force of the belt 10, the axial center L4 of rocking moves relatively slightly to the axial load direction Y in the plane perpendicular to the base axial center L1 (FIG. 4), and tilts slightly to the axial load direction Y side, strictly speaking, rotates (FIG. 5).

In fact, since the bushing 26 and thrust bearing 50 are interposed between the base 30 and the rocking arm 24, as shown in FIG. 5, the tilt is not large enough to be able to be visually discerned. The tilt angle θ is an extremely small value.

The torsion coil spring 60 biases the arm tubular part 246 and the bushing 26 in the pushing direction Z, and pushes against the base tubular part 34. The pushing direction Z is substantially the same direction as the axial load direction Y. Due to this, the force by which the rocking arm 24 pushes the bushing 26 becomes the total of the biasing force of the torsion coil spring 60 in the pushing direction Z and the pushing force of the belt 10 in the axial load direction Y. The bushing 26 is strongly sandwiched by the arm tubular part 246 and base tubular part 34, and in FIG. 4, a local force concentrates on the pushing portion 26w shown by hatching. The pushing direction Z does not strictly have to coincide with the axial load direction Z, but the range is preferably in the range of ±20 degrees around the base axial center L1 with respect to the axial load direction Y (the counterclockwise direction being made "forward").

If the tension of the belt 10 is increased in the state with the belt 10 wound around the pulley, the pushing force of the belt 10 in the axial load direction Y increases, and the rocking arm 24 rotates relatively in the clockwise direction of FIG. 4. Therefore, the torsion coil spring 60 elastically deforms in the direction compressing the coil diameter, so that the reaction force of the twisting torque increases. Along with this, the biasing force of the torsion coil spring 60 in the pushing direction Z also increases. Therefore, the force substantially coinciding with the sum of the two forces, i.e., the force of the rocking arm 24 pushing the pushing position 26w of the bushing 26 outside in the radial direction, becomes relatively larger.

The frictional force occurring between the rocking arm 24 and the bushing 26 is proportional to the vertical load acting on the contact surfaces which are the rocking arm outer circumferential surface 246a and the bushing inner circumferential surface 26a, or, is proportional to the force pushing outside in the radial direction. As explained above, since this vertical load becomes relatively large when the belt tension increases, a large frictional force occurs. Further, since the bushing 26 is strongly pushed to the open side inner circumferential surface 34a of the base 30, a large frictional force is generated between the bushing outer circumferential surface 26b and the open side inner circumferential surface 34a. Therefore, when the rocking arm 24 rotates relatively in the clockwise direction of FIG. 4, a relatively large frictional resistance acts on the rocking arm 24 as the first damping force. Due to this, the rocking arm 24 is strongly braked, the pulley 10 slowly follows the belt 10, and the vibration of the belt 10 is attenuated.

Figure 6:
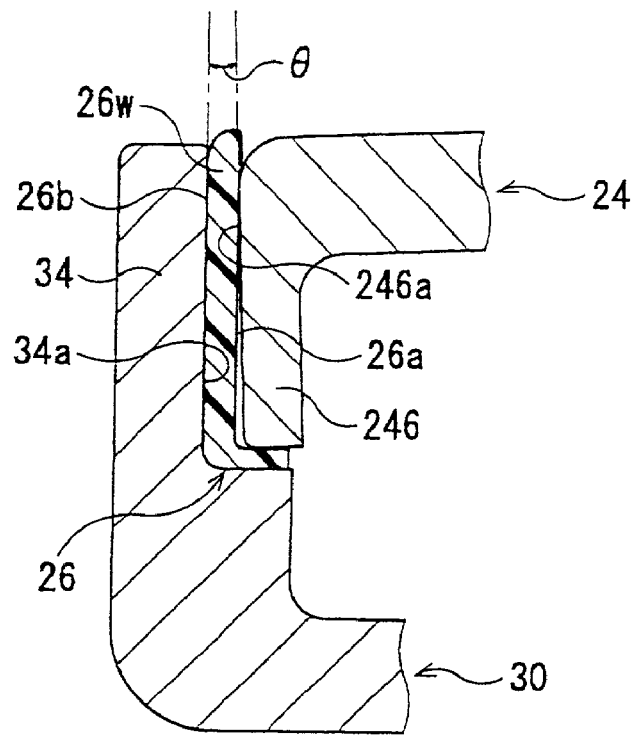
FIG. 6 is a partially enlarged sectional view of FIG. 2 showing the state of the bushing being sandwiched between the base and the rocking arm.

Further, as shown in the partially enlarged view of FIG. 6, if the axial center L4 of rocking is tilted by the angle θ, the rocking arm tubular part 246 is not placed parallel to the base tubular part 34, but is tilted to the axial load direction Y by the angle θ (in FIG. 6, rotates toward the bottom left). In other words, near the pushing position 26w, the distance between the open side inner circumferential surface 34a and the arm outer circumferential surface 246a becomes gradually smaller toward the opening of the base 30. Thus, the pushing position 26w is more strongly sandwiched the further toward the opening, much like a wedge, by the open side inner circumferential surface 34a and the arm outer circumferential surface 246a. Therefore, a so-called wedge-effect like action is added to the frictional resistance caused by the pushing action, and therefore a large damping force can be stably exerted. Note that, in FIG. 6, for the explanation, the degree of tilt is shown exaggeratedly. In fact, the tilt is not as great as illustrated.

On the other hand, when the tension of the belt 10 is reduced, the force received from the belt 10 is reduced, the rocking arm 24 rotates relatively in the counterclockwise direction of FIG. 4 by the twisting torque of the torsion coil spring 60, and the torque coil spring 60 elastically deforms in the direction increasing the coil diameter, so the twisting torque is reduced. Due to this, the rocking arm 24 moves relatively so that the axial center L4 of rocking coincides with the base axial center L1, and the force by which the rocking arm 24 pushes the bushing 26 in the pushing direction Z becomes extremely small. Further, since the degree of tilt of the rocking arm 24 becomes small and the open side inner circumferential surface 34a and arm outer circumferential surface 246a are placed substantially parallel, the force sandwiching the pushing position 26w also becomes small and the force applied to the bushing 26 is released. Therefore, the phenomenon such as the above wedge effect is eliminated, and the frictional force is reduced by an extreme amount. In this way, when the rocking arm 24 rotates relatively in the counterclockwise direction of FIG. 4, the second damping force acting on the rocking arm 24 is suppressed to a low level, and the rocking arm 24 is not braked that much, so the ability of the pulley 22 to follow the belt 10 becomes higher, and a predetermined tension is quickly imparted to the belt 10.

Thus, according to the autotensioner 20 of the embodiment, by displacing the rocking arm 24 in accordance with the direction of rotation, it is possible to relatively change the damping force, and possible to effectively dampen vibration without reducing the tension of the belt 10.

In a conventional device, the clearance between the base (30) and the rocking arm (24) or stepped bolt (40) rotating relative to the base (30) was filled completely by a synthetic resin bushing. Tilt of the rocking arm (24) or relative displacement in the radial direction were not allowed. Therefore, the force pushing the bushing (26) outside in the radial direction was substantially constant without regard as to the rotational direction of the rocking arm 24, and it was difficult to make the first damping force and second damping force much different. In the autotensioner 20 of the embodiment, however, by providing a clearance allowing displacement of the axial center L4 of rocking between the rocking arm 24 and stepped bolt 40 and the base 30, it is possible to greatly change the force by which the rocking arm 24 pushes the bushing 26, and it is possible to increase the difference between the first and second damping forces. Such an autotensioner 20 does not require the addition of any new parts or productions steps compared with a conventional device. Conversely, since it does not require precision in processing the rocking shaft 244 and the shaft hole part 38, the production becomes easy.

Further, the amount of abrasion of the pushing portion 26w of the bushing 26 is larger than that of other portions, but since the rocking arm 24 is displaceable, even if the thickness of the pushing portion 26w is reduced, the rocking arm 24 and stepped bolt 40 can displace slightly with respect to the base 30 in the direction of the reduction of thickness by the biasing force of the torsion coil spring 60 (matching with pushing direction Z in FIG. 4), and it is possible to keep the bushing 26 and the rocking arm 24 in close contact at all times. Therefore, a stable frictional resistance is obtained.

Figure 7:
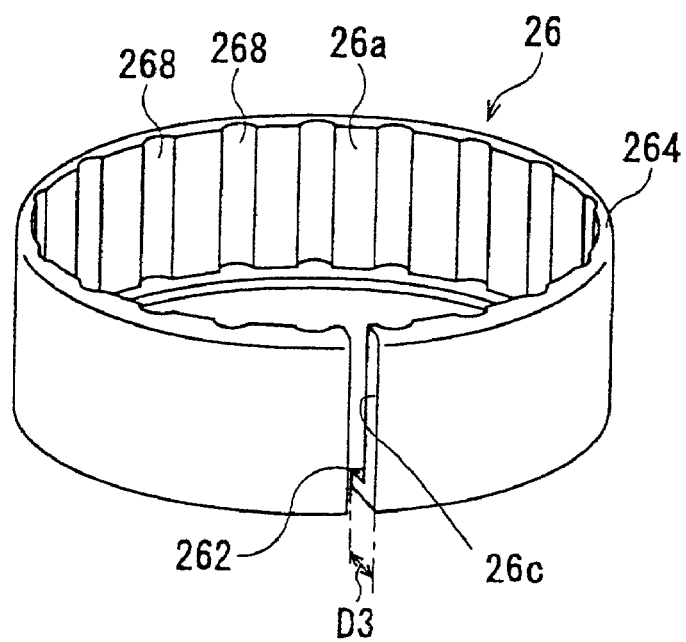
FIG. 7 is a perspective view of the bushing shown in FIG. 2.

FIG. 7 is a perspective view of the bushing 26. The bushing 26 is a tubular member integrally formed by injection molding from a synthetic resin material mainly comprised of for example polyphenylene sulfide. Polyphenylene sulfide is a synthetic resin having a highly crystalline polymer structure, and is superior in heat resistance, abrasion resistance, strength, and dimensional stability and extremely low in water absorption. Therefore, by using polyphenylene sulfide for the bushing 26, the bushing 26 can prevent an increase in the frictional force even when sprayed with water or salt water. Note that, the material may have added to it, in addition to the polyphenylene sulfide resin, materials for adjusting the frictional coefficient in accordance with the load to be received, for example, a polytetrafluoroethylene resin or molybdenum for imparting a self-lubrication property, a heat stabilizer, an antioxidant, or a UV degradation preventer. Further, as the main ingredient of the material, it is also possible to use the conventionally used polyether sulfone.

The bushing 26 is partially cut away in the circumferential direction. The cutaway part 26c allows expansion or contraction due to changes in temperature. Further, a flange 262 of a predetermined width extending inside in the radial direction is formed over substantially the entire circumference of the end of the bushing 26 at the base 30 side. The flange 262 is sandwiched between the front end surface of the arm tubular part 246 and the ring-shaped seat 34c of the base 30, to prevent abrasion due to contact of the two and prevent detachment of the bushing 26 from the base 30. The bushing 26 is slightly larger in outside diameter than the inside diameter D1 of the base tubular part 34 in natural length, and is interposed inside the base tubular part 34 in the state compressed in the radial direction. Therefore, the bushing 26 closely contacts the open side inner circumferential surface 34a of the base 30 due to the force for expansion in the radial direction. The bushing 26 has an axial length substantially the same as the axial length H1 of the tubular part 246 of the rocking arm 24 and the base tubular part 34, and brings the base tubular part 34 and arm tubular part 246 into close contact over the entire axis.

A plurality of grooves 268 extending over the entire axis are formed at the inner circumferential surface 26a of the bushing 26. The grooves 268 function to collect the abraded dust produced when the bushing 26 rubs against the rocking arm 24 and releases it outside. Due to this, abrasion of the inner circumference 26a due to the abraded dust is prevented. Note that the sectional shape of the grooves 268 is semicircular in the embodiment, but is not particularly limited to a semicircular and may also be a longitudinal sectional shape, triangular sectional shape, etc. Further, the depth of the grooves is not particularly limited, but if too deep, flexing occurs, while if too shallow, abraded dust collects in the grooves 268, so it is necessary that the grooves have a suitable depth. In the same way for the groove width, if too large, the necessary frictional force is not obtained, while if too narrow, the abraded dust collects in the grooves 268, so the grooves have to be set to a suitable width.

The cut away part 26c of the bushing 26 is arranged at the opposite side of the pushing position 26w with the largest abrasion (see FIG. 3), i.e., the top right in FIG. 3. Due to this, expansion in the radial direction due to abrasion is easy, so that a stable frictional force can be obtained. Note that, in the embodiment, the bushing 26 is a partially cut away tubular shape, and it is sufficient to set it in a range for pushing by the rocking arm 24. Specifically, it should be set over a range of ±90 degrees around the base axial center L1 from the axial load direction Y.

The autotensioner 20 of the embodiment exhibits a thin shape with a diameter of the base 30 which is relatively large with respect to its axial length, and a bushing (or friction member) 26 is provided at the outside of the torsion coil spring 60. Therefore, the diameter of the bushing 26 is relatively large, and the area of the frictional surface with the rocking arm 24 can be set large. Further, since the bushing 26 is in close contact with the arm tubular part 246 over the entire axis, the area of the frictional surface can be made large. Therefore, even if the rotational angle of the rocking arm 24 is small, a relatively large frictional force can be obtained. Further, since the working position of the frictional force can be set further from the axial center L4 of rocking (or the base axial center L1), the rocking arm 24 can be effectively braked.

The rocking arm 24 frictionally sliding with the bushing 26 is formed by an aluminum alloy. When forming the bushing 26 from a nylon resin etc. as in a conventional device, the frictional force with respect to the rocking arm 24 increases when the bushing 26 is exposed to water or salt water, so there is the problem that smooth rotation of the rocking arm 24 is obstructed, and abnormal noise such as belt squeaking occurs. In the embodiment, the main ingredient of the bushing 26 is changed from nylon resin to polyphenylene sulfide resin. Due to this, it is possible to prevent an increase in the frictional force even when the bushing 26 is exposed to water or salt water. This is considered to be because a polyphenylene sulfide resin has a highly crystalline polymer structure and a low hydrophilicity.

The pulley side end 264 of the bushing 26 is exposed to the outside, so allows water or salt water to enter the interface with the base tubular part 34 and the arm tubular part 246, and the outer surface is easily exposed to water or salt water. Nevertheless, since the bushing 26 is formed by a material mainly comprised of polyphenylene sulfide resin, the frictional force does not increase even if exposed to water, smooth rocking of the rocking arm 24 is not obstructed, and the stick-slip phenomenon or belt squeaking is prevented.

Figure 8:
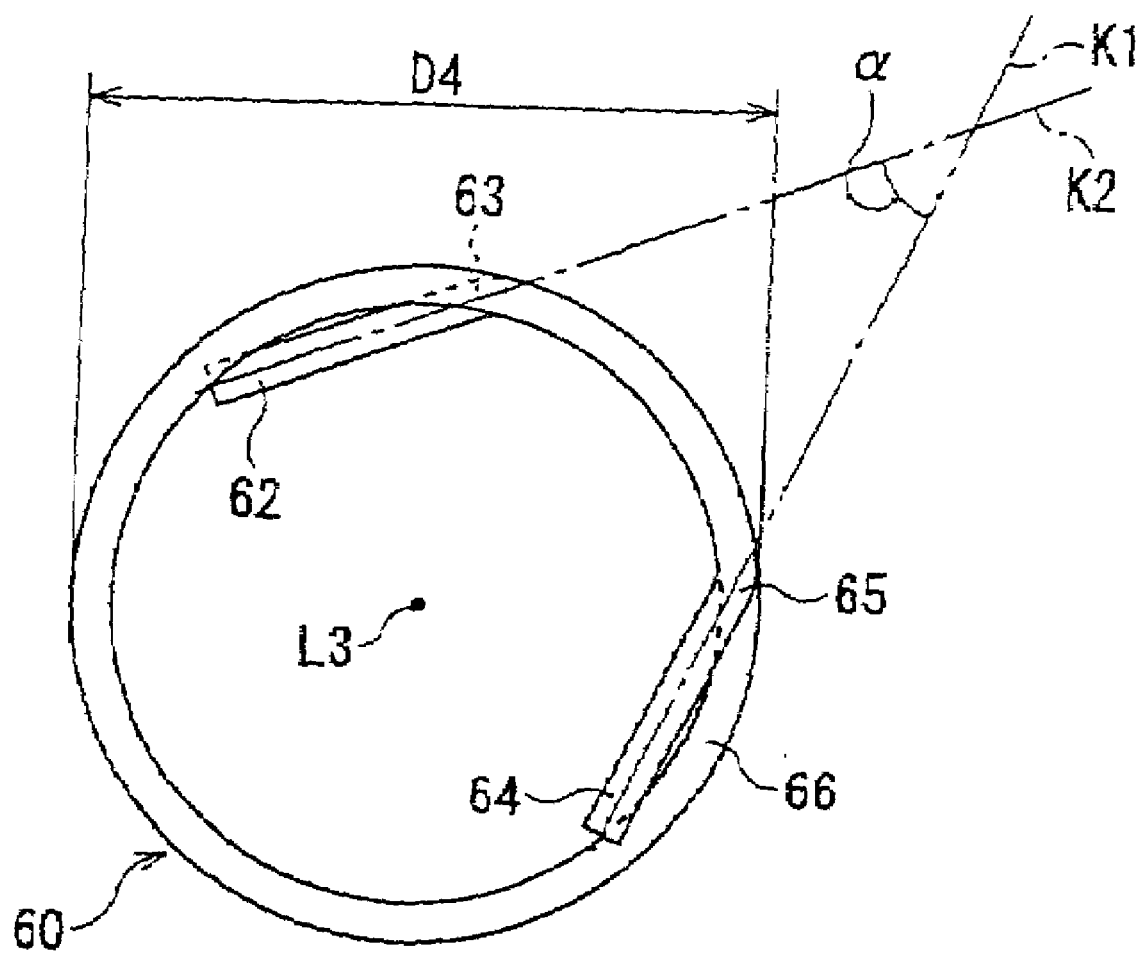
FIG. 8 is a plan view of a torsion coil spring shown in FIG. 2.

FIG. 8 is a plan view of the torsion coil spring 60 seen from the rocking arm 24 side. The torsion coil spring 60 is provided with a spiral part 66 having a diameter D4 in the no-load state. The number of turns of the spiral part 66 is about 2.2. One end 62 engaged with the base 30 extends straight from the spiral part 66, and is at the spiral axial center L3 side from the spiral part 66 and perpendicular to the spiral axial center L3. The other end 64 engaged with the rocking arm 24 has the same structure as the one end 62. In the plane perpendicular to the spiral axial center L3, the angle a formed by the line K1 extending to the bent part 63 side through the center of the one end 62 and the line K2 extending to the bent part 65 side through the center of the other end 64 is about 60 degrees, but a range of 50 to 80 degrees is preferable.

Figure 9:
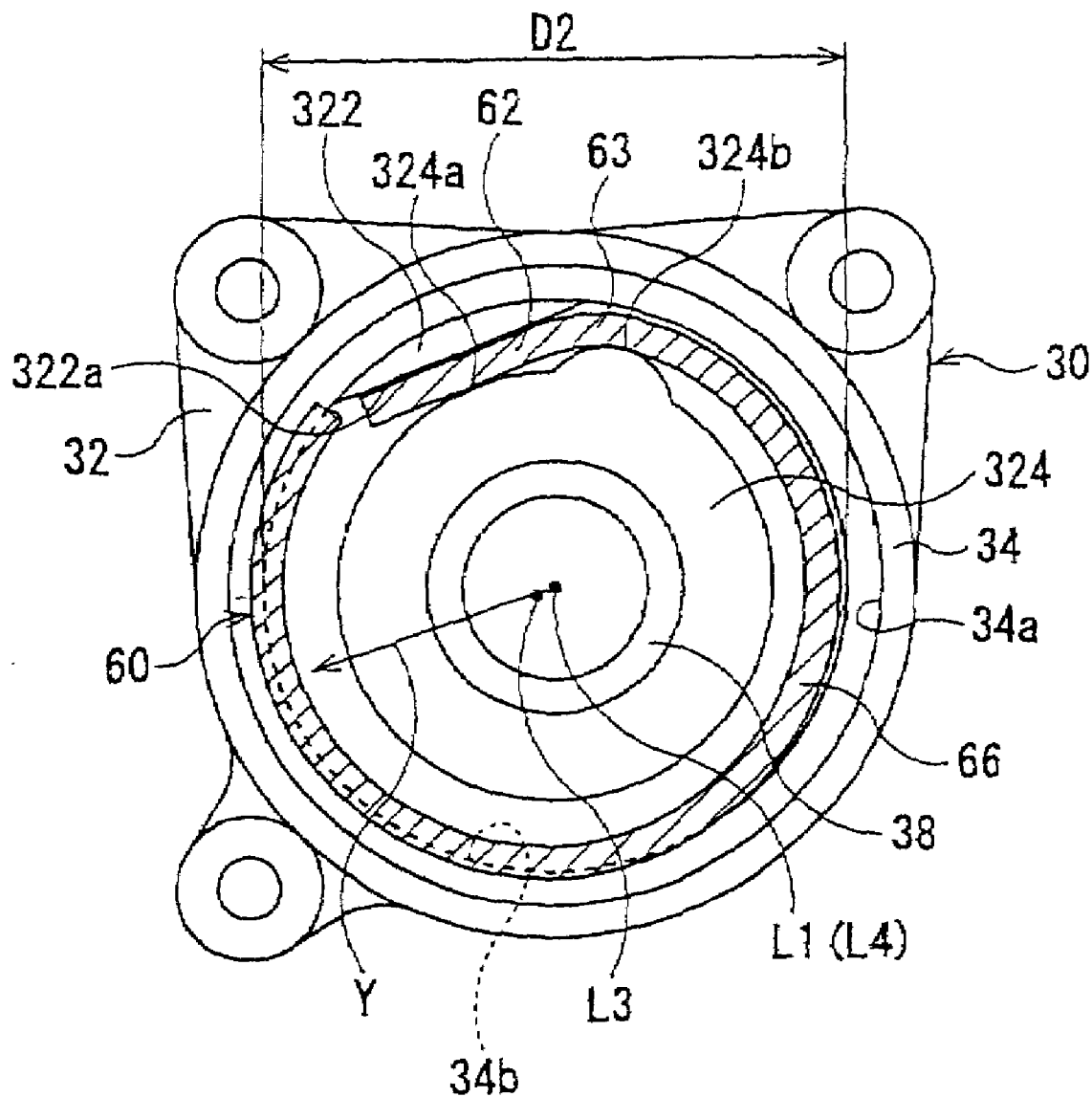
FIG. 9 is a plan view of the state of the end of the torsion coil spring attached to the base.

FIG. 9 is a plan view of the state of attachment of the torsion coil spring 60 to the base 30 seen from the rocking arm 24 side. Note that the torsion coil spring 60 is shown by hatching, and that only one turn at the base 30 side is shown. Two engagement projections 322 and 324 gripping the one end 62 are formed at the base bottom 32. The first engagement projection 322 exhibits a crescent shape projecting out from inside the base tubular part 34. The side surface 322a, which is a flat plane, supports the one end 62 from the outside in the radial direction. The second engagement projection 324 exhibits a ring shape provided across the entire circumference of the base shaft hole part 38, and abuts against the one end 62 from the inside. The outer circumferential surface of the second engagement projection 324 partially projects out in an arc at the outside in the radial direction. The projecting curved surface 324b abuts against the bent part 63 of the torsion coil spring 60. Thus, the one end 62 is engaged with the base bottom 32, and in the engaged state, the one end 62 is substantially parallel to the axial load direction Y.

The outside diameter D4 (see FIG. 8) of the spiral part 66 is larger than the diameter D2 of the ring-shaped chamber 100 in which the part is to be housed. In the state where one end 62 s is engaged with the base 30 and the end 62 is made a free end so that no load is applied to the end 62, the spiral axial center L3 does not coincide with the base axial center L1, and is offset to a position deviated left downward in the drawing. The eccentric direction of the spiral axial center L3 with respect to the base axial center L1 is substantially the same direction as the axial load direction Y.

Figure 10:
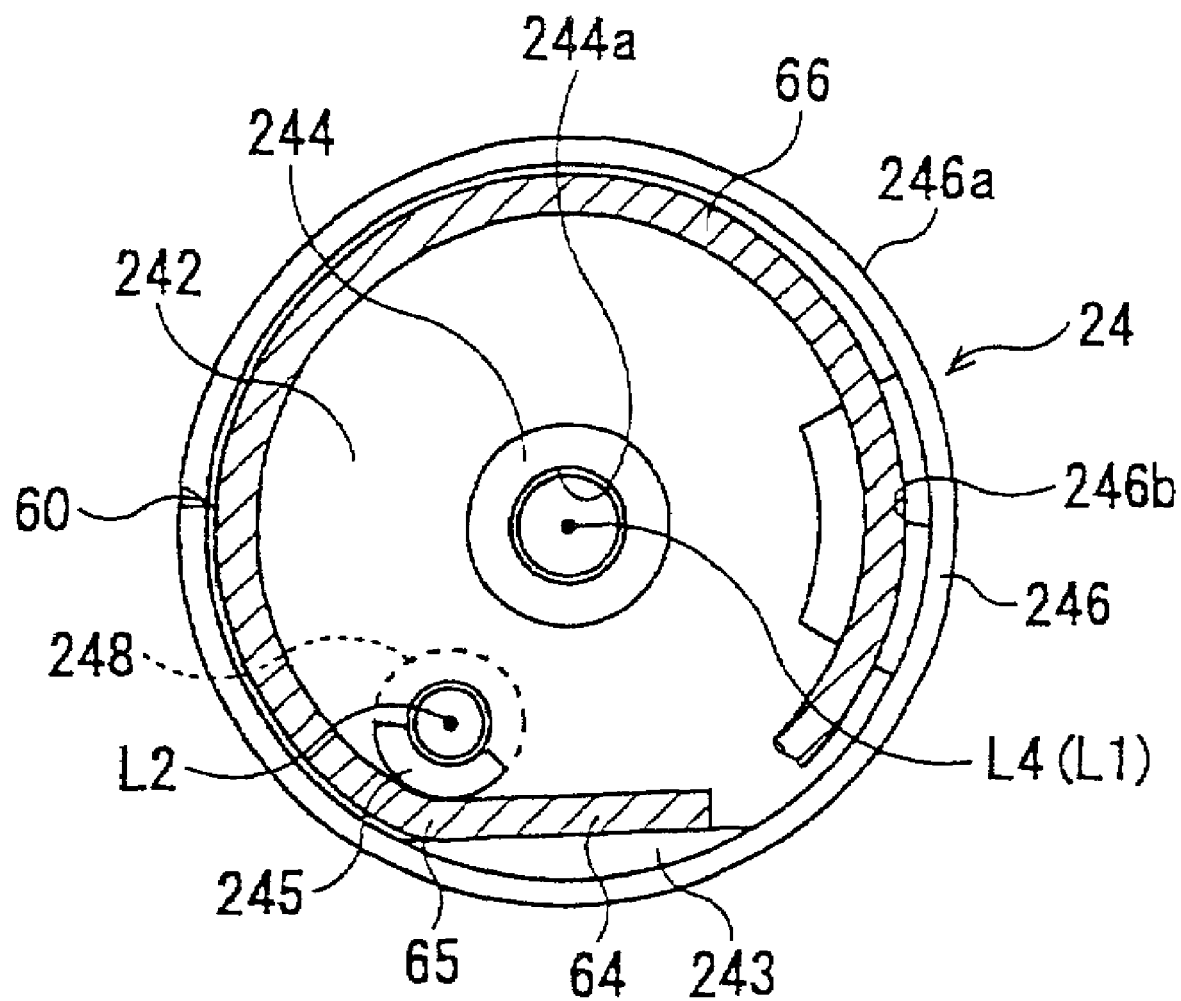
FIG. 10 is a plan view of the state of the end of the torsion coil spring attached to the arm.

FIG. 10 is a plan view of the state of attachment of the torsion coil spring 60 to the rocking arm 24 seen from the base 30 side. In the drawing, the torsion coil spring 60 is shown by hatching, and only one turn of the rocking arm 24 side is shown. The arm bottom 242 is provided with a crescent-shaped third engagement projection 243 projecting out to the inside from the arm tubular wall 246 and a crescent-shaped fourth engagement projection 245 provided at a rear side of the pulley bearing 248. The third engagement projection 243 supports the other end 64 of the torsion coil spring 60 from the outside of the radial direction, while the fourth engagement projection 245 supports the bent part 65 formed by the connecting part of the other end 64 and the spiral part 66 from the inside of the radial direction. Thus, the other end 64 of the torsion coil spring 60 is engaged with the rocking arm 24.

When assembling the autotensioner 20, first, one end 62 of the torsion coil spring 60 is engaged with the base 30 in which the bushing 26 is fit (first step). With the other end 64 in the free end state, the spiral part 66 cannot be housed in the base 30, so next the rocking arm 24 is placed over the torsion coil spring 60, and the other end 64 is engaged with the third and fourth engagement projections 243 and 245 (second step). By rotating the rocking arm 24, the torsion coil spring 60 is twisted in a direction in which the diameter of the spiral part 66 is reduced (clockwise direction of FIG. 9) (third step). Due to this, the outside diameter of the spiral part 66 becomes smaller than the diameter D2, so that the part can be housed in the ring-shaped chamber 100. After that, the rocking arm 24 is pushed to the base 30 side to compress the torsion coil spring 60 in the base axial center L1 direction (fourth step), then the stepped bolt 40 is screwed into the rocking arm 24 in the compressed state, and the rocking arm 24 is fixed rotatably to the base 30 (fifth step). Further, the pulley 22, ball bearing 70, washer 72, and mounting bolt 74 are assembled (sixth step). Due to the above first to sixth steps, an autotensioner 20 in the state shown in FIG. 2 is obtained.

In general, the size of the base 30 housing the torsion coil spring 60 is determined by the size of the mounting space assigned to the autotensioner 20. The size of the torsion coil spring 60, or the limits of the outside diameter and axial direction length, is determined by itself in accordance with the size of the base 30. In recent years, along with the increasingly small size of engines, the mounting space of the autotensioner 20 has also become narrower, and the size of the base 30 has become smaller. On the other hand, the load on the belt 10 tends to increase along with the improvement in performance of the engine. Therefore, an increase in the output load to be imparted to the belt 10, or an increase in the spring torque, is sought for the autotensioner 20 as well. However, the spring torque is proportional to the coil thickness of the torsion coil spring 60, so if the base 30 is made smaller, the output load falls, while if the output load is set high, there is the problem that the base 30 has to be made larger.

In a conventional device, a torsion coil spring was prevented from contacting the base or rocking arm by housing in the base the torsion coil spring provided with an outside diameter smaller than the inside diameter of the base or rocking arm and twisting it by a predetermined angle to bias the rocking arm. By twisting, the outside diameter of the torsion coil spring becomes further smaller, so the clearance between the torsion coil spring and the base becomes larger, which causes the housing space (corresponding to the ring-shaped chamber 100) to be used ineffectively. Therefore, the inventors took note of the point that twisting results in the outside diameter of the torsion coil spring becoming smaller, and discovered the method of twisting and then housing the torsion coil spring 60 of the outside diameter D4 a certain degree larger than the diameter D2 of the ring-shaped chamber 100 so as to make effective use of the ring-shaped chamber 100. Due to this, the effect was obtained that even if the volume of the ring-shaped chamber 100 is the same as in the conventional device, it is possible to use a torsion coil spring 60 longer than in the conventional device, and that it is possible to increase the output load without enlarging the base 30 or the rocking arm 24. Further, the number of assembly steps is no different from the conventional device.

The configuration of the torsion coil spring 60 is effective in the case of application to a thin autotensioner 20 with an outside diameter relatively larger than the axial length such as in the embodiment. The reason is that when enlarging the outside diameter without changing the axial length of the torsion coil spring 60, even if the amount of increase of the outside diameter is the same, the amount of increase of the coil length becomes larger the larger the diameter of the torsion coil spring 60. Further, in the case of a thin model autotensioner, since the axial length of the base 30 is short, the work of tilting and housing the torsion coil spring 60 and engaging its one end with the base 30 becomes extremely easy. Further, since the amount of compression of the outside diameter is large even at the same twisting angle compared with a small diameter torsion coil spring, it is possible to sufficiently compress the diameter by just twisting.

Figure 11:
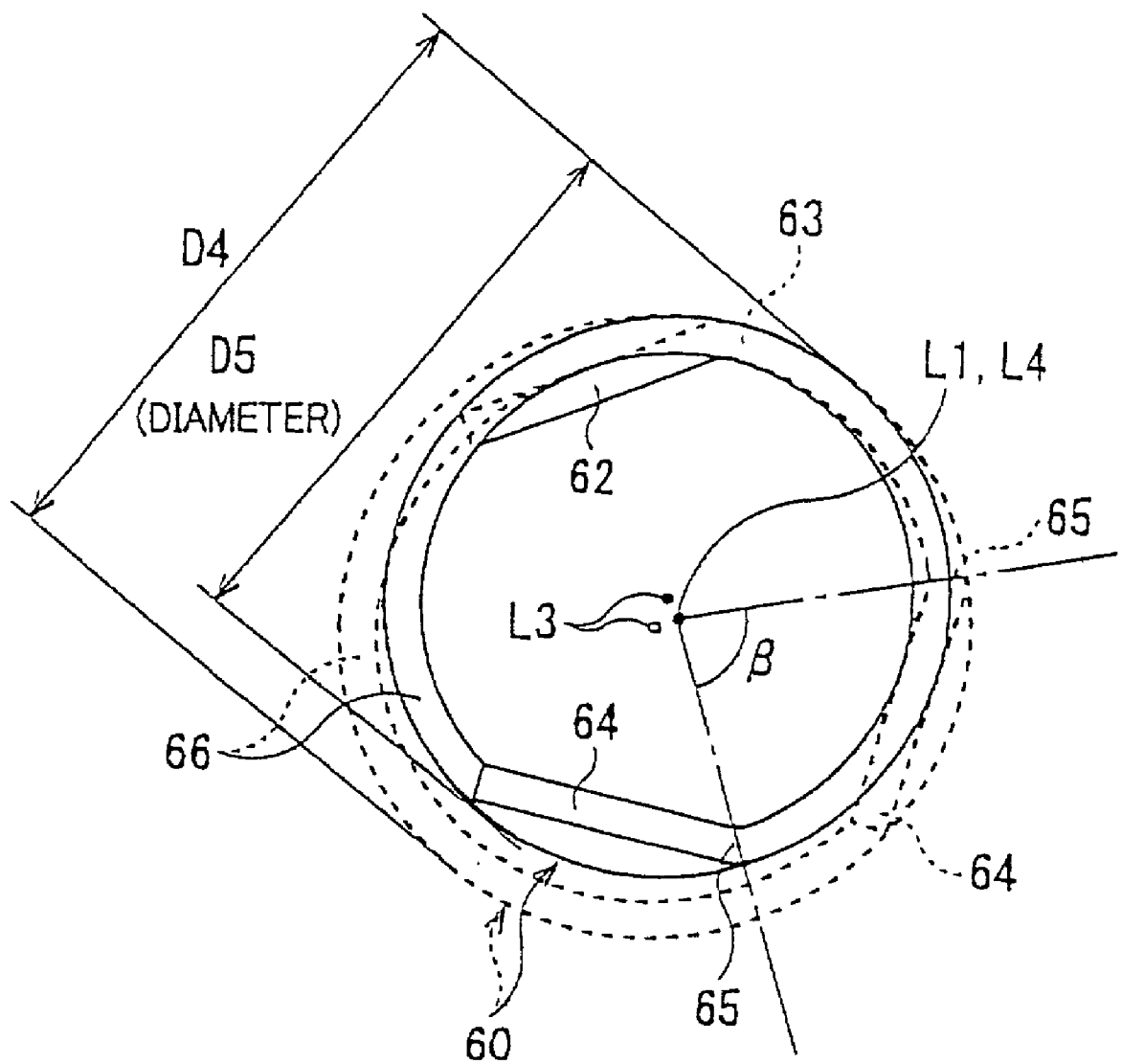
FIG. 11 is a view of the dimensional differences before and after assembly of the torsion coil spring.

FIG. 11 is a view comparing the torsion coil spring 60 before and after the third step (twisting step). The torsion coil spring 60 before twisting is shown by a broken line, while the torsion coil spring 60 after twisting is shown by a solid line.

If the other end 64 is twisted by the twisting angle β in the clockwise direction about the axial center L1 in the state engaged with one end 62, the outside diameter of the torsion coil spring 60 is compressed from D4 to D5. At this time, the position separated from the one end 62 of the spiral part 66, in particular the position far from the bent part 63 engaged with the base 30, is shifted to the base axial center L1 side. The spiral axial center L3 deviates from the initial position shown by the white circle to a position close to the bent part 63 shown by the black circle. The spiral axial center L3 after assembly of the autotensioner 20 is eccentric with respect to the base axial center L1 in the top right direction in the drawing, i.e., the direction substantially opposite to the axial load center Y.

The outside diameter D5 of the spiral part 66 after twisting is set to a value smaller than the diameter D2 of the ring-shaped chamber 100. Namely, the outer circumference of the spiral part 66 is set to a value smaller than the diameter D2 by the clearance for separating the outer circumference of the spiral part 66 to an extent so as not to interfere with the arm inner circumferential surface 246b and the bottom inner circumferential surface 34b.

Thus, the torsion coil spring 60 is housed in the base 30 in an eccentric and twisted state, so that the rocking arm 24 is pushed in the pushing direction Z substantially coinciding with the axial load direction Y, and the rocking arm 24 is made to tilt. Therefore, it is possible to increase the force by which the rocking arm 24 pushes the bushing 26 when the belt is tensed, and possible to set the first damping force to an extremely large value and enhance the damping effect. The process of assembly of the torsion coil spring 60 is easy as described above.

The eccentric position and amount of eccentricity of the spiral axial center L3 after assembly of the autotensioner 20 are determined by the angle α (see FIG. 8) formed by the two ends 62 and 64, the twisting angle β, and the positions of the engagement projections 322 and 324 and the outer circumference 324b of the base 30. These values and positions and the diameter D2 of the ring-shaped chamber 100 housing the torsion coil spring 60 and the number of turns and outside diameter D4 of the natural length of the torsion coil spring 60 are not limited to the embodiment. It is of course possible to change the design to the values and positions bringing out most effectively the damping performance of the autotensioner 20.

Figure 12A:
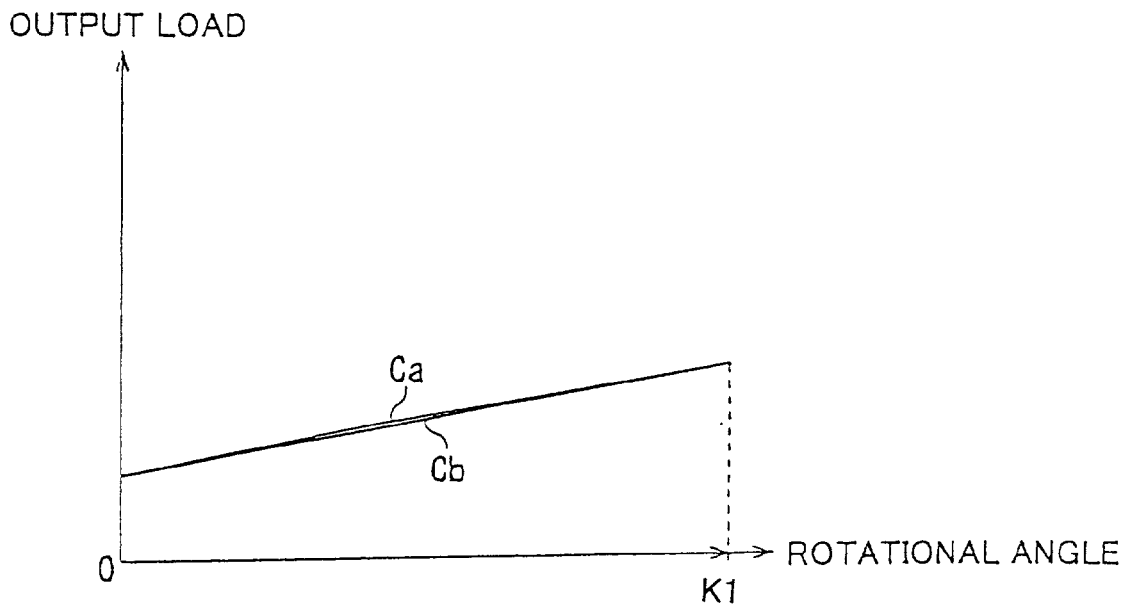
FIGS. 12a and 12b are graphs of the output characteristics of the autotensioner shown in FIG. 1 in the case without the bushing and the case with the bushing.

The characteristics of an autotensioner 20 will be explained below with reference to graphs of FIGS. 12a and 12b. FIG. 12a is a graph of the output characteristic of the autotensioner 20 without the bushing 26 and provided with only the torsion coil spring 60. In this graph, the rotational angle of the rocking arm 24 from a predetermined initial position is the abscissa, and the output load of the autotensioner 20 is the ordinate.

When the rocking arm 24 rotates from the initial position to the rotational angle K1, i.e., rotates forward, since only the proportionally increasing twisting torque acts on the rocking arm 24, the forward operation load Ca output from the autotensioner 20 increases proportionally along with the increase of the rotational angle. When the rocking arm 24 rotated to the rotational angle K1 returns to the initial position due to the twisting torque of the torsion coil spring 60, i.e., rotates in reverse, since the twisting torque falls proportionally, the reverse operation load Cb output from the autotensioner 20 falls in proportion to the reduction in the rotational angle. The lines showing the forward operation load Ca and the reverse operation load Cb substantially match, and the inclinations of the lines match with the torsion spring constant of the torsion coil spring 60.

Figure 12B:
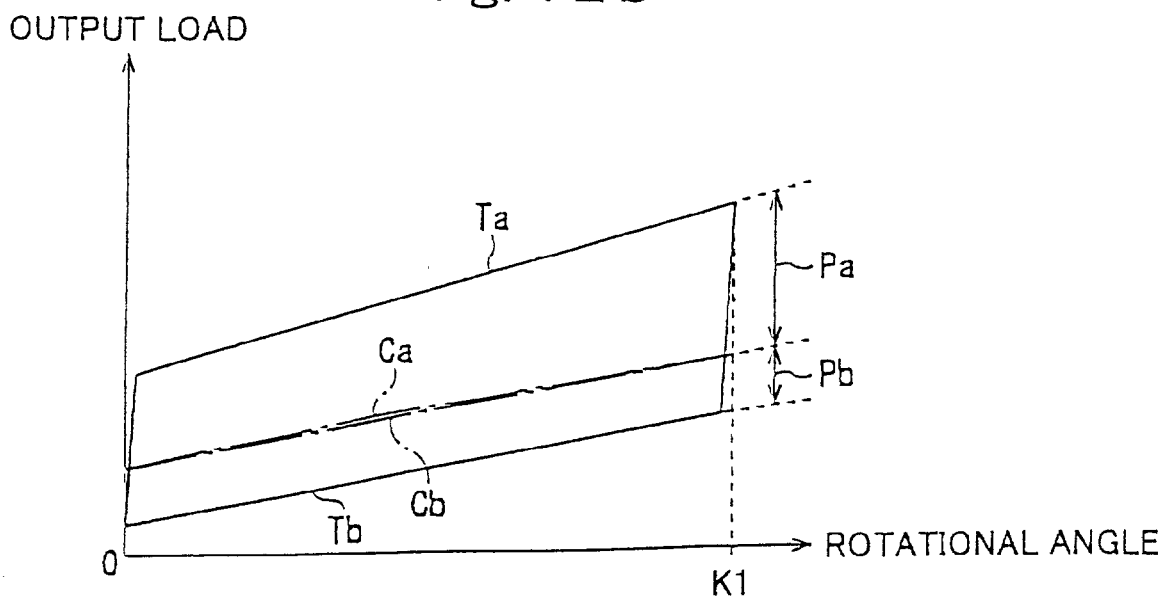

FIG. 12b is a graph of the output characteristics of the autotensioner 20 provided with both of the bushing 26 and torsion coil spring 60. For reference, the output characteristic of a torsion coil spring 60 alone (forward operation load Ca and reverse operation load Cb) is shown by a one-dot chain line.

The forward operation load Ta when providing the bushing 26 is larger by the load Pa (Pa=Ta−Ca) from the forward operation load Ca at the time of the torsion coil spring 60 alone. This load Pa corresponds to the frictional resistance caused by the bushing 26, i.e., the first damping force. Further, the reverse operation load Tb when providing the bushing 26 is smaller by the load Pb (Pb=Tb−Cb) from the reverse operation load Cb at the time of the torsion coil spring 60 alone. This load Pb is the frictional resistance caused by the bushing 26, i.e., the second damping force.

As shown in FIG. 12b, the second damping force Pb is substantially constant from the initial position to the angle K1. The first damping force Pa becomes gradually larger as the rotational angle becomes greater, and is always larger than the second damping force Pb. Thus, by providing the bushing 26, it is possible to impart a damping force Pa or Pb with a different magnitude in accordance with the direction of rotation of the rocking arm 24. The ratio of magnitude of the first damping force Pa and the second damping force Pb is Pa:Pb=1.5 to 3.5:1. This ratio can be set to any ratio by changing the frictional coefficient of the bushing 26 and the outside diameter of the arm tubular part 246.

As described above, in the autotensioner 20, a clearance is provided between the rocking arm 24 and stepped bolt 40 and the base 30 to allow relative displacement of the rocking arm 24, and the torsion coil spring 60 is made eccentric and pushes the rocking arm 24 in the pushing direction Z substantially matching with the axial load direction Y. Due to this, when the rocking arm 24 moves in the A direction (FIG. 1), the torsion coil spring 60 is twisted, the rocking arm 24 displaces relative to the axial load direction Y so that the rocking arm 24 is pushed strongly against the bushing 26, and the clockwise rotation of the rocking arm 24 is braked by the relatively large first damping force. Conversely, when the rocking arm 24 moves in the B direction, the twisting of the torsion coil spring 60 is released, the rocking arm 24 separates from the bushing 26, so that the second damping force becomes smaller and the rocking arm 24 can easily rotate counterclockwise. Namely, the damping performance of the autotensioner 20 can be improved, and the tracking ability becomes extremely good.

Figure 13:
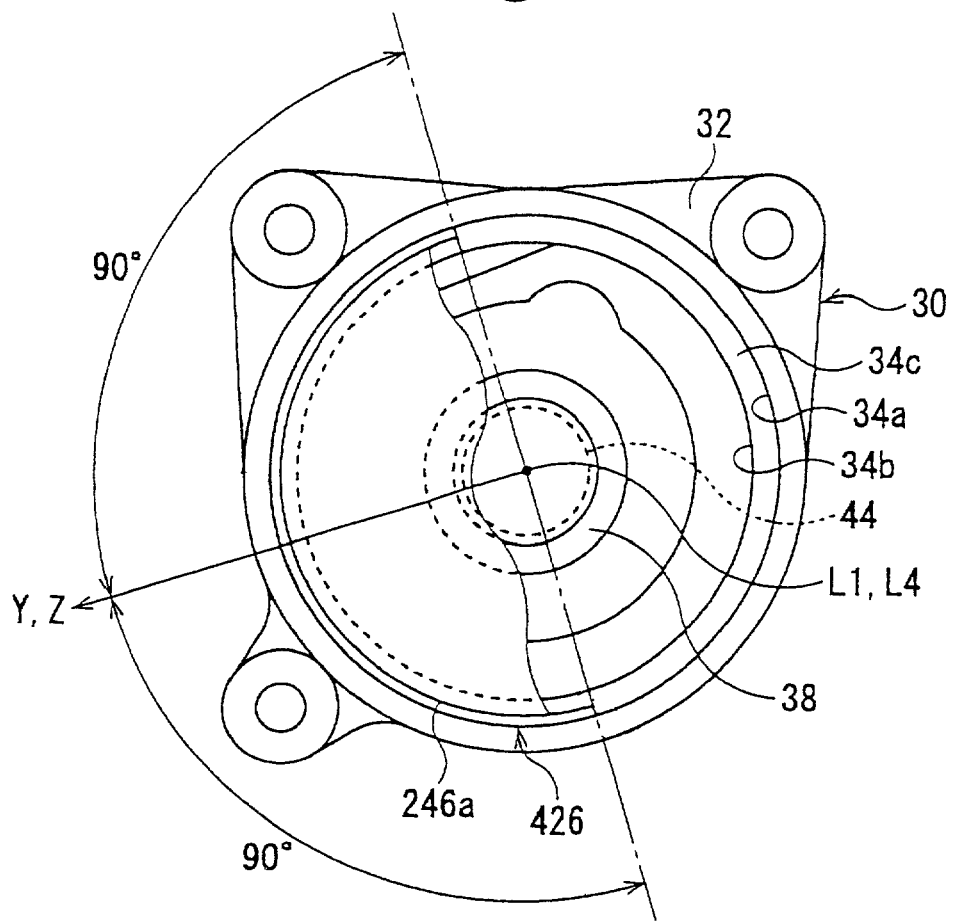
FIG. 13 is a view of a second embodiment of an autotensioner according to the present invention, showing part of the bushing and rocking arm attached to the base.
Figure 14:
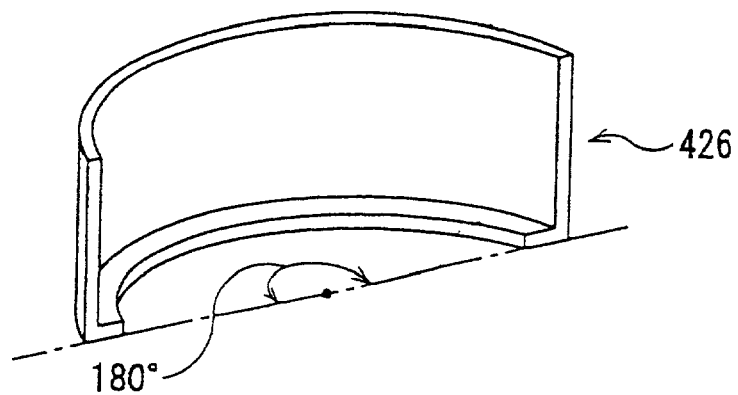
FIG. 14 is a perspective view showing the bushing of FIG. 13 partially cut away.

A second embodiment of the autotensioner will be described below with reference to FIG. 13 and FIG. 14. FIG. 13 is a plan view of an autotensioner, and shows only part of the bushing and rocking arm attached to the base. FIG. 14 is a perspective view of the bushing. The autotensioner of the second embodiment is provided with the same configuration as the first embodiment except for the point of the different shape of the bushing. The same parts are assigned the same reference numerals, and explanations thereof are omitted.

The bushing 426 of the second embodiment is a semitubular member provided extending over a range of 180 degrees around the base axial center L1. The center in the circumferential direction is on the axial load direction Y. Namely, the bushing 426 slides against the arm outer circumferential surface 246a across a range of ±90 degrees from the axial load direction Y.

The bushing 26 in the first embodiment is a tubular shape, and the portion most receiving the load is the pushing position 26w in the axial load direction Y (FIG. 4). This receives the load for exactly the range of about ±90 degrees from the axial load direction Y. Therefore, at the position at the opposite side, the bushing 26 is separated from the arm outer circumferential surface 246a, and no frictional force is generated. Due to this, in the second embodiment, the semitubular portion extending over the range of ±90 degrees from the axial load direction Y required for the frictional sliding is used as the bushing 426. Even with this shape, it is possible to obtain similar effects as the first embodiment. Note that, while not shown, it is preferable to provide a rotation stop for positioning the bushing 426 at the bushing 426 or base 30. Thus, according to the second embodiment, similar to the first embodiment, it is possible to improve the damping performance without reducing the following ability and to further reduce the material used from the first embodiment.

Figure 15:
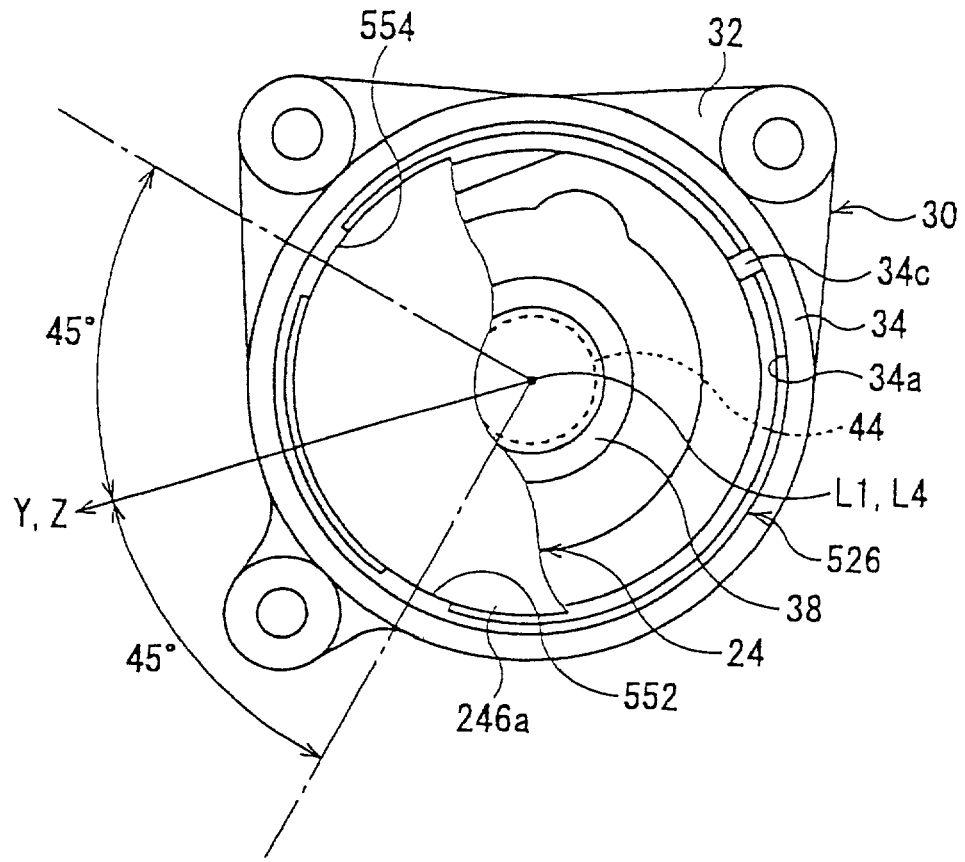
FIG. 15 is a view of a third embodiment of an autotensioner according to the present invention, showing part of the bushing and rocking arm attached to the base.
Figure 16:
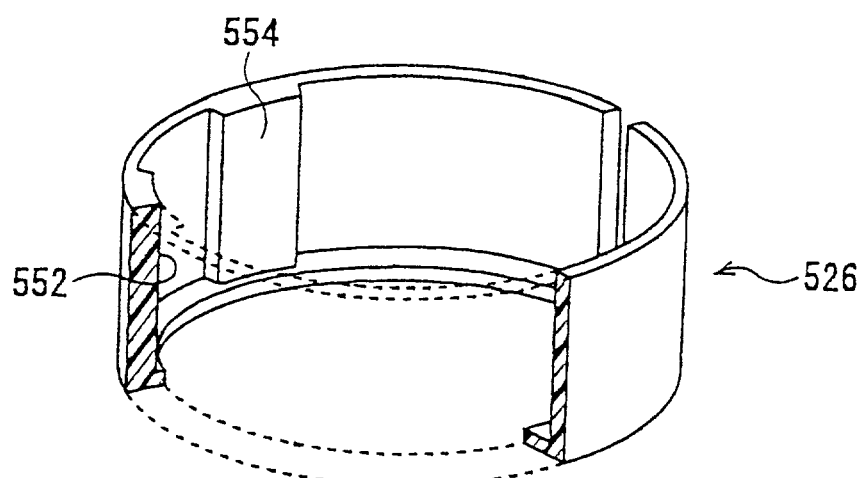
FIG. 16 is a perspective view showing the bushing of FIG. 15 partially cut away.

A third embodiment of the autotensioner will be described below with reference to FIG. 15 and FIG. 16. FIG. 15 is a plan view of an autotensioner, and shows only part of the bushing and rocking arm attached to the base. FIG. 16 is a perspective view of the bushing partially cut away. The autotensioner of the third embodiment is provided with the same configuration as the first embodiment other than the point of the different shape of the bushing. The same parts are given the same reference numerals, and explanations thereof are omitted.

The bushing 526 is provided with two projections 552 and 554 projecting out to the inside in the radial direction. The arm outer circumferential surface 246a closely contacts the bushing 526 only at the projections 552 and 554, and does not contact the other portions of the bushing 526. The projections 552 and 554 are provided across the entire axis of the bushing 526, and are 45 degrees apart from the axial load direction Y (pushing direction Z) in the circumferential direction. The force pushing the bushing 526 when the belt 10 is wound concentrates in the axial load direction Y. In the third embodiment, however, the projections 552 and 554 receive the load, so that the load is dispersed. Further, since the projections 552 and 554 are at positions of 45 degrees with respect to the axial load direction Y, the load applied becomes $1/\sqrt{2}$ of the load in the axial load direction Y. Therefore, according to the third embodiment, in the same way as the first embodiment, not only is it possible to improve the damping performance without reducing the following ability, it is also possible to prevent early damage and early abrasion of the bushing 526, and possible to improve the endurance of the autotensioner 20.

Note that the angle formed with respect to the axial load direction Y of the projections 552 and 554 is not limited to the above 45 degrees, and may also be 30 degrees or 60 degrees. Further, the bushing 526 is a tubular member, but may also be a semitubular member such as in the second embodiment.

Figure 17:
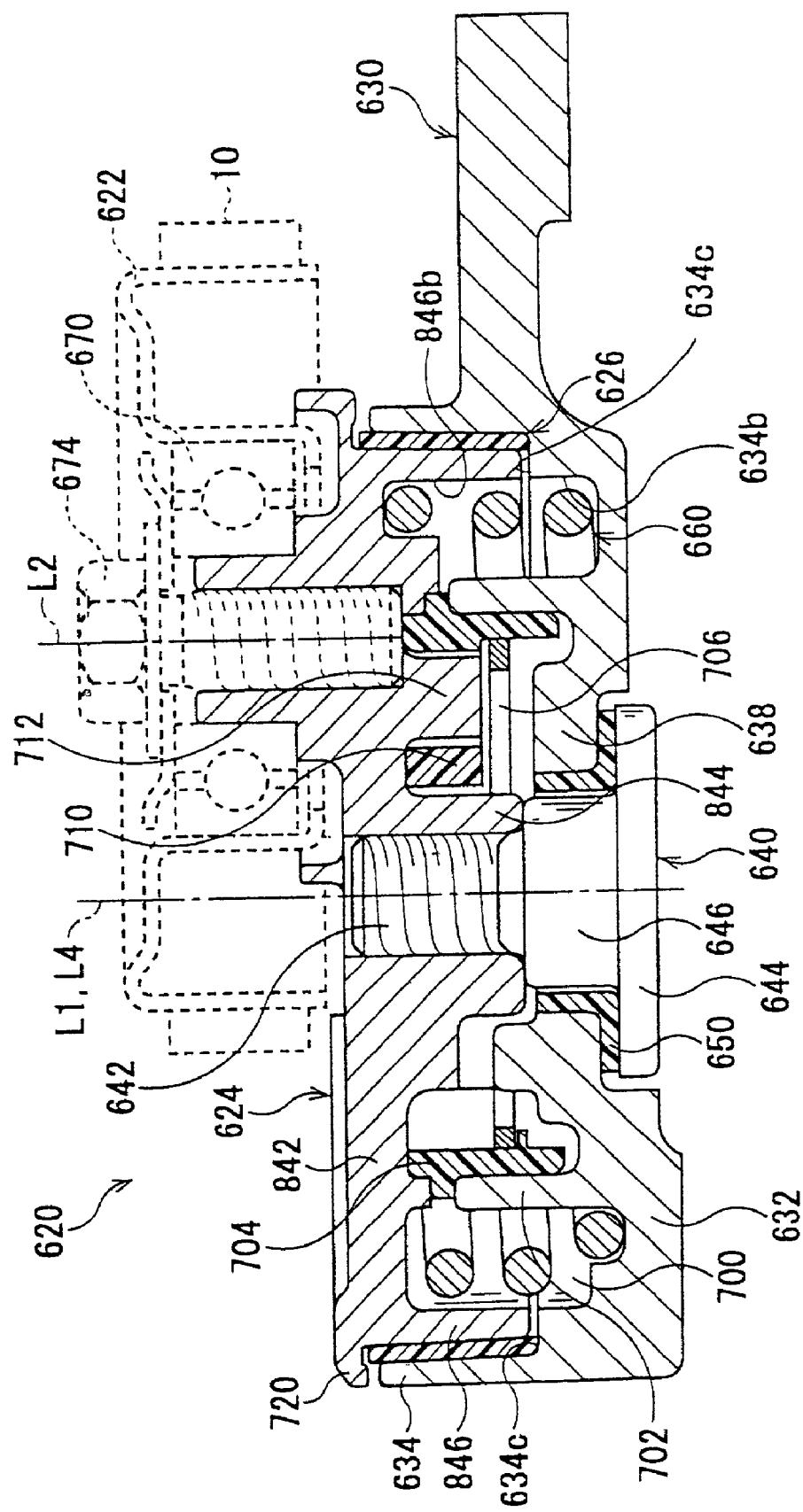
FIG. 17 is a sectional view of a fourth embodiment of an autotensioner according to the present invention.
Figure 18:
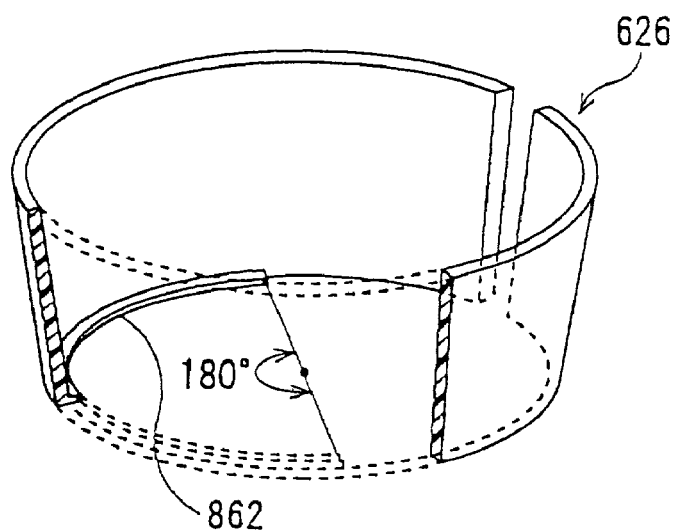
FIG. 18 is a perspective view showing the bushing of FIG. 17 partially cut away.

A fourth embodiment of the autotensioner will be described below with reference to FIG. 17 and FIG. 18. FIG. 17 is a sectional view of an autotensioner, while FIG. 18 is a perspective view of a bushing. The autotensioner of the fourth embodiment is provided with the same configuration as the first embodiment other than the point of the different shapes of the bushing and thrust bearing, and the point of further provision of the damping mechanism. Similar parts are given the same reference numerals plus 600, and explanations thereof are omitted. Note that the pulley and surrounding parts are shown by broken lines.

In the autotensioner 620 of the fourth embodiment, a ring-shaped chamber 700 is formed by the base bottom 632, the arm disk 842, the bottom inner circumferential surface 634b of the base 630, the arm inner circumferential surface 846b, the base shaft hole part 638, and the rocking shaft 844. The ring-shaped chamber 700 houses not only the torsion coil spring 660, but also the damping mechanism.

In the first embodiment, the only member imparting frictional resistance to the rocking arm 24 is the bushing 26, and sometimes a sufficient damping force may not be obtained with just the bushing 26. The fourth embodiment is further provided with a separate damping mechanism imparting a frictional force to the rocking arm 624 to meet with this demand, so that a high damping force is generated.

The damping mechanism is provided with a second tubular part 702 integral with the base 30, a tubular damping member 704 attached to the rocking arm 624, and a ring spring 706 pushing the damping member 704 from the inside to the second tubular part 702. Since these configurations are the same as the damping mechanism shown in Japanese Patent No. 2981433, a detailed explanation is omitted. The damping member 704 rotates integrally with the rocking arm, and frictionally slides with the second tubular part 702. The frictional force generated at this time is proportional to the biasing force of the ring spring 706. Not only the frictional force generated at the bushing 626, but also the frictional force generated at the damping member 704 acts on the rocking arm 624. Thus, it is possible to apply stronger braking to the rocking arm 624.

A clearance allowing relative displacement of the rocking arm 624 is provided between the mounting hole 710 of the damping member 704 and the mounting pin 712 of the rocking arm 624 engaged with the mounting hole 710. Due to this, when the rocking arm 624 displaces, strain and damage are prevented from occurring at the damping member 704. Further, regardless of the displacement of the rocking arm 624, it is possible to generate a stable frictional force.

The thrust bearing 650 is not a ring-shaped member, but a tubular member provided with a flange. The thrust bearing 650 is fit snugly into the base shaft hole part 638, and faces the cylindrical part 646 of the stepped bolt 640 passed through the inside with a clearance. Regarding the base axial center L1 direction, the thrust bearing 650 is held without clearance by the bolt head 644 and the base bottom 632. Due to this, the relative displacement of the rocking arm 624 is allowed, and abrasion due to mutual interference between the base 30 and the stepped bolt 40, which are formed from the metal material, can be prevented. Note that the tubular part of the thrust bearing 650 may be formed in a taper becoming smaller in diameter toward the rocking arm 624 side.

The bushing 626 has a tapered cross-section where the diameter becomes gradually smaller toward the base bottom 632. A flange 862 extending toward the inside of the radial direction is formed integrally with one end of the tubular part across about 180 degrees. The flange 862 is sandwiched between the base 30 and the front end of the rocking arm tubular part 846, and has the function of not only preventing the bushing 626 from detaching from the base 30, but also stopping rotation in the circumferential direction. While not shown, the ring-shaped seat 634c of the base 630 is formed in a step shape to engage with the flange 862 at the circumferential direction. The flange 862 is preferably provided across a range of ±90 degrees from the axial load direction where the tilt of the rocking arm 624 is the greatest to prevent extreme tilting of the rocking arm 624.

The rocking arm bottom 842 is formed across the entire circumference with a flange 720 covering the bushing 626. The flange 720 covers the top end of the bushing 626, and extends at a slant downward in the drawing up to the opening of the base tubular part 634. The top end of the bushing 626 is protected from the outside by the flange 720, so that the entry of dust, water, salt water, etc. to the surface of the bushing 626 is prevented. Further, the damping member 704 provided inside the ring-shaped chamber 700 is also protected simultaneously from dust, water, salt water, etc.

As described above, even in the autotensioner 620 of the fourth embodiment, in the same way as the first embodiment, the damping force is changed by displacing the rocking arm, so that the damping performance can be improved without reducing the following ability. Further, by providing the damping member 704, it is possible to set a high damping force. Further, by providing the thrust bearing 650 between the shaft hole part 638 and the bolt 640 and providing the flange 720 covering the end of the bushing 626, it is possible to prevent early damage and early abrasion of the base 30 or bushing 62, and possible to improve the endurance of the autotensioner 620.

Figure 19:
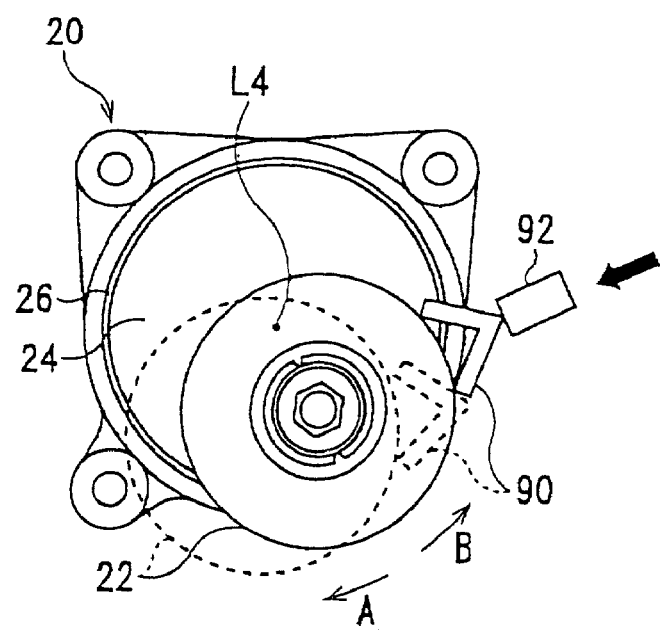
FIG. 19 is a view of the state of measurement of the output load of an autotensioner.
Figure 20:
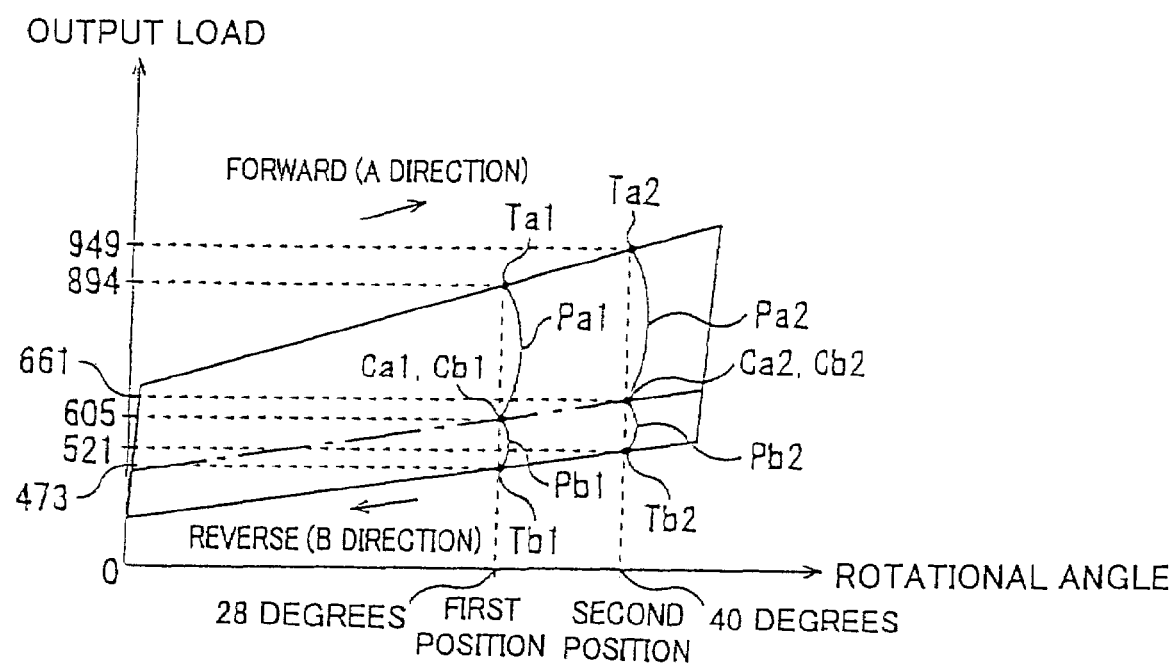
FIG. 20 is a view of the result of measurement of an output load of an autotensioner.

The autotensioner 20 was tested for endurance, and the change in the ratio of the damping force and first and second damping forces along with the elapse of time was investigated. FIG. 19 is a view of the layout showing the state of an endurance test, while FIG. 20 is a graph of the results of measurement of an autotensioner in the initial state.

In the endurance test, the output load when removing the bushing 26 from the autotensioner and providing only the torsion coil spring 60, and the output load when providing the bushing 26 of the first embodiment (see FIG. 2), were measured in the initial state immediately after assembly. Further, a separate autotensioner provided with the same structure as the autotensioner used for measurement of the initial state was used for the belt transmission mechanism shown in FIG. 1 for 180 hours, and in the fatigue state after the elapse of 180 hours, the output load when providing only the torsion coil spring 60 and the output load when providing the bushing 26 were measured.

In the measurement of the output load, a V-block 90 was made to abut against the side surface of the pulley 22 to push the pulley 22 in one direction to make the rocking arm 24 rotate forward, then the V-block 90 was returned to make the rocking arm 24 rotate in reverse. The load received by the V-block 90 from the pulley 22, i.e., the output load of the autotensioner 20, was measured by a detector 92 attached to the V-block 90.

Table 1 shows results of measurement of the forward operation load and reverse operation load of the autotensioner in the initial state when the rocking arm 24 is in the first position shown by the solid line in FIG. 19 (rotational angle of 28 degrees) and the second position shown by the broken line in FIG. 19 (rotational angle of 40 degrees), the first and second damping forces Pa and Pb at the different positions, and the ratio of the two (Pa/Pb).

TABLE 1

|  |  | Autotens. overall | Torsion coil spring alone | Damping force | Damping ratio Pa/Pb |
|---|---|---|---|---|---|
| First pos. | Forward | Ta1 = 894 | Ca1 = 605 | Pa1 = 289 | Pa1/Pb1 = 2.19 |
|  | Reverse | Tb1 = 473 | Cb1 = 605 | Pb1 = 132 |  |
| Second pos. | Forward | Ta2 = 949 | Ca2 = 661 | Pa2 = 288 | Pa2/Pb2 = 2.06 |
|  | Reverse | Tb2 = 521 | Cb2 = 661 | Pb2 = 140 |  |

Table 2 shows results of measurement of the forward operation load and reverse operation load of the autotensioner in the fatigue state when the rocking arm 24 is in the first position and the second position, the first and second damping forces Pa and Pb at the different positions, and the ratio of the two (Pa/Pb). The dimensions, shape, and material, that is, frictional coefficient, of the bushing 26 used here and the outside diameter of the rocking arm 24 (arm tubular part 246) are the same as those of the autotensioner measured in the initial state.

TABLE 2

| | | Autotens. overall | Torsion coil spring alone | Damping force | Damping ratio Pa/Pb |
|---|---|---|---|---|---|
| First pos. | Forward | Ta1 = 793 | Ca1 = 571 | Pa1 = 222 | Pa1/Pb1 = 1.79 |
| | Reverse | Tb1 = 447 | Cb1 = 571 | Pb1 = 124 | |
| Second pos. | Forward | Ta2 = 853 | Ca2 = 620 | Pa2 = 233 | Pa2/Pb2 = 1.83 |
| | Reverse | Tb2 = 493 | Cb2 = 620 | Pb2 = 127 | |

The results of the experiments shown in the above two tables are examples. According to the above results of experiments and the results of other experiments on the autotensioner changing the frictional coefficient of the bushing 26, the outside diameter of the arm 24, the endurance, etc., it is learned that the first damping force Pa is always larger than the second damping force Pb, the ratio Pa/Pb is in the range of 1.5 to 3.5, and a proportional relationship always stands both at the first position and second position and even after fatigue.

Figure 21:
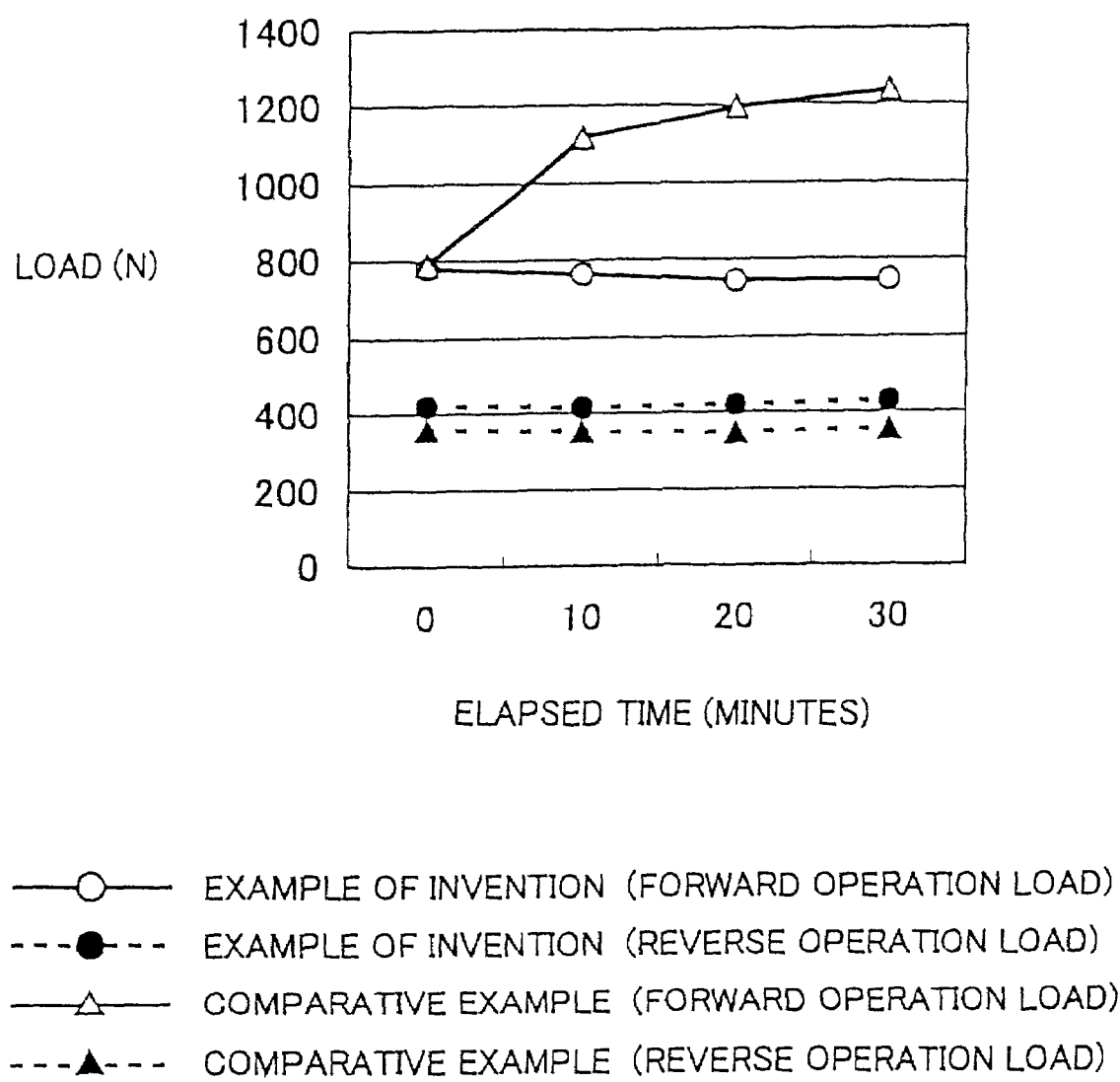
FIG. 21 is a graph of the results of a water spraying test.

Below, an example of the bushing 26 will be described. As an example, a bushing is formed from a material mainly comprised of a polyphenylene sulfide resin (PPS), while as a comparative example, a bushing was formed by a material mainly comprised of a partial aromatic polyamide resin (PPA). FIG. 21 shows the results of a water spraying test conducted using the bushing of the example and the bushing of the comparative example.

The water spraying test was performed by attaching the bushing of the example of the invention and the bushing of the comparative example to the autotensioner 20 shown in FIG. 2. In the test, the base 30 was fixed in place, the rocking arm 24 was made to rock by a rocking amplitude of ±1.5 mm, a frequency of 25 Hz, and a room temperature environment, and water was sprayed toward the clearances of the rocking arm 24 and the base 30. Further, the output load of the autotensioner 20 was measured every 10 minutes. Note that the "forward operation load" shown in the table means the output load when the belt 10 is pushed against and the rocking arm 24 rotates in the counterclockwise direction of FIG. 1, while the "reverse operation load" means the output load when the rocking arm 24 rotates in a direction tensing the belt 10 (clockwise direction of FIG. 1).

As is clear from the graph of FIG. 21, in the case of the bushing of the comparative example, the reverse operation load does not change much at all, but the value of the forward operation load rises along with the elapsed time. This shows that the frictional force arising due to the frictional sliding of the bushing of the comparative example and the rocking arm 24, in particular the frictional force arising when the rocking arm 24 rotates counterclockwise, rises due to spraying by water. Therefore, if using a bushing 26 formed by a material mainly comprised of a PPA resin, the frictional force becomes too high when water is sprayed, a stick-slip phenomenon arises, and there is the danger of the easy occurrence of abnormal noise.

Conversely, in the case of the bushing of the example, in the same way as the comparative example, the reverse operation load is substantially constant, and the forward operation load is substantially constant regardless of the elapsed time though it is slightly smaller in value after spraying with water than in the initial state (elapsed time of 0). Namely, from the results of the test, it was learned that if using a bushing formed by a material mainly comprised of a polyphenylene sulfide resin, the frictional force does not change even when water is sprayed, and the response of the belt to tension does not deteriorate.

Although the embodiments of the present invention have been described herein with reference to the accompanying drawings, obviously many modifications and changes may be made by those skilled in this art without departing the scope of the invention.

The present disclosure relates to subject matter contained in Japanese Patent Application No. 2001-114769 (filed on Apr. 13, 2001), No. 2001-115003 (filed on Apr. 13, 2001), and No. 2001-129141 (filed on Apr. 26, 2001) which are expressly incorporated herein, by reference, in their entirety.

The invention claimed is:

1. An autotensioner comprising:
 a base that has a bottomed tubular shape;
 a rocking arm that has a tubular part rotatably supported at the inside of said base;
 a pulley that is attached to one end of said rocking arm, and abuts against a belt;
 a torsion coil spring that is housed in said base, and biases rotation of said rocking arm in a direction tensioning said belt with respect to said base; and
 a friction member that is interposed between an outer circumferential surface of said tubular part and an inner circumferential surface of said base;
 said torsion coil spring being attached eccentrically to the axial center of said base, one end of said torsion coil spring is connected to said base and the other end of said torsion coil spring is connected to said rocking arm, and said rocking arm being supported to be able to be displaced relative to said base, such that a first damping force acting on said rocking arm when said belt is tensioned is relatively larger than a second damping force acting on said rocking arm when said belt is slack.

2. The autotensioner according to claim 1, wherein said rocking arm is attached movably in the radial direction to said base.

3. The autotensioner according to claim 1, wherein said friction member is provided across a range of at least 180 degrees around the axial center of said base, a part of said tubular part being biased to be pushed against said friction member by said torsion coil spring.

4. The autotensioner according to claim 3 wherein said friction member is provided with a plurality of projections for dispersing the load acting in a direction in which said torsion coil spring pushes and biases said friction member.

5. The autotensioner according to claim 1, wherein the magnitude of the first damping force is 1.5 to 3.5 times the magnitude of the second damping force.

* * * * *